(12) United States Patent
Hanson et al.

(10) Patent No.: US 9,029,457 B2
(45) Date of Patent: May 12, 2015

(54) SILICA-SUPPORTED OLIGOMERIC HYBRID MATERIALS

(75) Inventors: Paul Ronald Hanson, Lawrence, KS (US); Alan Rolfe, Lawrence, KS (US)

(73) Assignee: The University of Kansas, Lawrence, KS (US)

( * ) Notice: Subject to any disclaimer, the term of this patent is extended or adjusted under 35 U.S.C. 154(b) by 667 days.

(21) Appl. No.: 13/152,531

(22) Filed: Jun. 3, 2011

(65) Prior Publication Data
US 2011/0301311 A1 Dec. 8, 2011

Related U.S. Application Data

(60) Provisional application No. 61/351,018, filed on Jun. 3, 2010.

(51) Int. Cl.
*C08K 3/34* (2006.01)
*C08F 30/02* (2006.01)
*C08F 232/08* (2006.01)

(52) U.S. Cl.
CPC .............. *C08F 30/02* (2013.01); *C08F 232/08* (2013.01); *Y10S 977/754* (2013.01)

(58) Field of Classification Search
USPC ............................ 524/493; 526/194; 977/754
See application file for complete search history.

(56) References Cited

PUBLICATIONS

Buchmeiser et al (ROMP-based, highly hydrophilic poly(7-oxanorborn-2-ene-5,6-dicarboxylic acid) coated silica for analytical and preparative scale high-performance ion chromatography, Chem. Mater. 1999, 11, 1533-1540).*
Buchmeiser et al (Ring opening metathesis polymerization for the preparation of surface grafted polymer supports, Macromolecules 2000, 33, 32-39).*
Gatschelhofer et al (Evaluation of ring opening metathesis polymerization derived monolithic capillary high performance liquid chromatograph columns, Journal of Chromatography A, 1090 (2005), 81-89).*
Ahn et al (Nanocomposites from silica nanoparticles polynorbornenes with pendant cholesterols, Polymer Preprints 2008, 49(2), 760).*

* cited by examiner

*Primary Examiner* — Wenwen Cai
(74) *Attorney, Agent, or Firm* — Maschoff Brennan, PLLC

(57) ABSTRACT

A particle-polymer hybrid material can include: a substance having the structure of Formula 1 Z(Y-FP)$_m$, wherein Z is a particle smaller than 1 mm; m is an integer; Y is a linker including a silicon atom linked to the particle; FP is a functionalized polymer having: a first structure derived from a first norbornene compound linked to the Y; and one or more repeating units linked to the first structure, each unit being derived from a second norbornene compound and having a functional group.

18 Claims, 8 Drawing Sheets

Si-OBAC₅₀ 50-mer 4

Si-OBAC₁₀₀ 100-mer 5

Si-ODCT₅₀ 50-mer 7

Si-OTPP₅₀ 50-mer 9

US 9,029,457 B2

SILICA-SUPPORTED OLIGOMERIC HYBRID MATERIALS

CROSS-REFERENCE TO RELATED APPLICATION

This patent application claims the benefit of U.S. Provisional Application 61/351,018, filed on Jun. 3 2010, which Provisional Application is incorporated herein by specific reference in its entirety.

STATEMENT OF GOVERNMENT SUPPORT

This invention was made with Government support under Grant Nos. NIH-STTR R41 GM076765 and NIH P050-GM06966 awarded by the National Institutes of General Medical Sciences. The Government has certain rights in this invention.

BACKGROUND

Development of immobilized reagents and scavengers for application in various chemical protocols continues to be important. Since the introduction of polystyrene immobilized resins, a variety of immobilization agents have been found, such as silica, fluorous, monolith, and polymers generated from ring-opening metathesis polymerization ("ROMP"). Investigations into these types of reagents and scavengers have resulted in surface functionalization of nanoparticles via polymer grafting. This technique provides a method for the preparation of particle-polymeric hybrid materials. Such hybrid materials combine the physical properties of the inorganic shell (e.g., particle size, pore and shape) with the tunable properties of the grafted organic polymer. Grafting of organic polymers onto the surface of nano-particles (e.g., Si and/or Co/C) can be facilitated either by chemical (covalent bonds) or physical (physisorption) methods. Grafted-hybrid materials, such as silica-polymer hybrids, may be important and useful as heterogeneous supported catalysts, which can be used in the automotive, electronic, and consumer industries. As such, surface-initiated ROMP can be used as an effective method for the grafting of organic-polymers from inorganic nano-particles, carbon nano-tubes, metal surfaces, and resins.

BRIEF DESCRIPTION OF THE FIGURES

The foregoing and following information, as well as other features of this disclosure, will become more fully apparent from the following description and appended claims taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
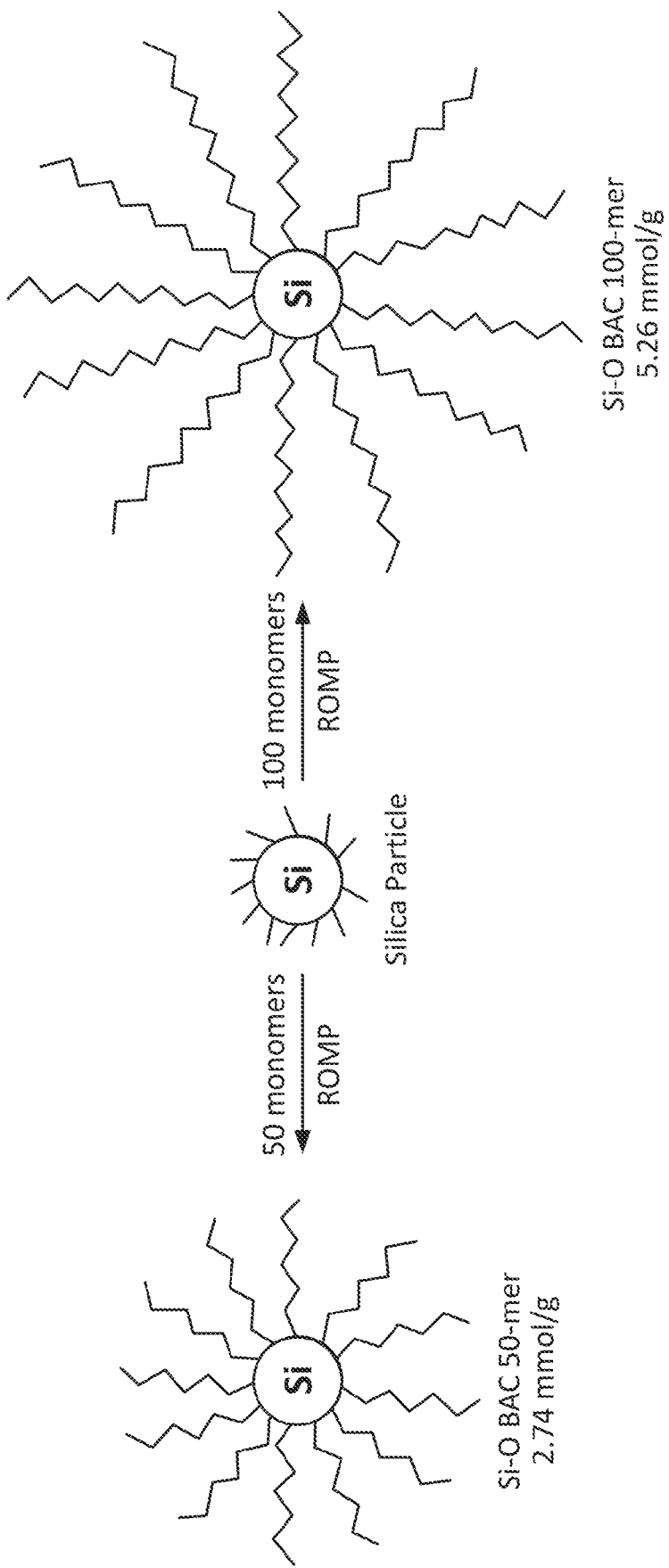
FIG. 1 includes a schematic representation of preparing a particle-polymeric hybrid nano-material, where the polymeric reagents can control the number of monomers for each polymeric material linked to a particle, such as silica.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present invention relates to surface-initiated, particle-supported ROMP to produce particle-supported polymeric hybrid materials (see FIG. 1). The particle-supported polymeric hybrid materials can be used as scavengers, catalysts, and reagents in synthetic protocols. The particle-supported polymeric hybrid materials can be referred to as particle-polymeric hybrid nano-materials, or PPHM, because the particle-linked polymer is a hybrid material on the nano-scale. The particles can be any type of particle; however, specific examples can include sillica (e.g., $SiO_2$) and magnetic (e.g., Co/C) particles. The polymer can also be considered to be an oligomer, where reference to oligomers and polymers herein can refer to the same material linked to the particle. Neither the term oligomer, nor polymer, is meant to indicate length or number of monomers of the polymeric material linked to the particle, and these terms can be used interchangeably.

These PPHM are derived from surface-initiated ROMP utilizing norbornenyl-tagged (Nb-tagged) particles. The PPHM combine the physical properties of the particle (e.g., silica) surface with the inherent tunable properties of the ROMP-derived polymers to yield high-load reagents and scavengers. The number of polymers per particle as well as the number of monomers per polymer can be modulated to vary the theoretical load. These PPHM can include higher loads (e.g., mmol/g) than existing commercial reagents and scavengers currently on the market.

The PPHM can be used as immobilized reagents and scavengers for application in facilitated protocols in drug discovery. In this regard, PPHM have wide application in parallel synthesis (e.g., as free powders), combinatorial chemistry, automated synthesis protocols, solid phase extraction protocols (SPE), flow-through platforms such as flow-through cartridges, and purification free parallel synthesis protocols. The PPHM can be useful to facilitate reactions by sequesterizing substances, such as alcohols, that would otherwise inhibit reactions or promote unfavorable side reactions. Also, Nb-tagged particle materials can be used in sequestration protocols, such as for cleaning and/or regenerating PPHM cartridges. The PPHM can be used for immobilized reagents and scavengers, such as metal scavengers.

Figure 4:
FIG. 4 includes a schematic representation of a standard functionalization of a particle.
Figure 5:
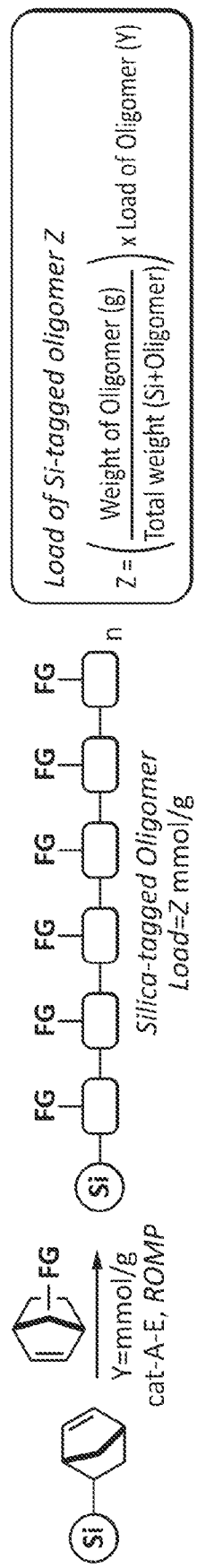
FIG. 5 includes a schematic representation of an embodiment of functionalization of a particle using surface-initiated ROMP chemistry.

Previously, commercially available silica-immobilized materials had not used polymerization off the surface to functionalize the silica surface (see FIG. 4). Now with the present invention, the use of polymerization from the silica surface can provide a PPHM (see FIG. 5) with increased load potential for complexing with another compound or substance. Increasing the load of such PPHM has an environmental and economic benefit as less reagent/scavenger substance is required. Also, a novel feature of surface-initiated ROMP reaction schemes of the present invention is that by extending the polymerizing chain length of the silica particle, higher loads of sequestration can be achieved. This allows tailoring the load potential for a particular process.

The synthesis of PPHM can be performed with a particle such as silica and polymerizable reagents that include functional substituent motifs, such as: bis-acid chloride (BAC); dichlorotriazine (DCT); triphenyl phosphine (TPP); triazole phosphate (TP); carbodiimide (ACC); benzyl phosphate (BP); monoamine (MAm); monoethyl azodicarboxylate (MEAD); benzylethyl azodicarboxylate (BEAD); sulfonyl chloride (SC); benzenesulfonyl chloride (BCS); acetic acid (HAc); pyridine (Py); benzaldehyde (BA); chlorophosphate (PC); and Trimercaptotriazine (TMT). Other functional substituents can be used. Growing ROMP-derived polymers from the silica surface can be achieved via surface-initiated ROMP utilizing norbornenyl-tagged (Nb-tagged) silica particles and corresponding norbornenyl (Nb) monomers to generate PPHM. These PPHM combine the physical properties of the silica surface with the inherent tunable properties of the ROMP-derived polymers to yield high-load reagents and scavengers.

First, an alkylsiloxane with a first norbornenyl group is linked to a particle, such as silica, Co/C or the like. Then, a reagent having another second norbornenyl group is linked to the particle through catalyzed reaction between the first and second norbornenyl groups. This reaction is conducted to polymerize the reagent onto the particle. The amount of reagent can be selected to determine the number of monomers per polymer chain that extends from the particle. The amount of monomer provides an indication of the amount of loading that can be achieved, where one monomer can scavenge one molecule, such as one alcohol molecule. Thus, the number of available monomers can be tailored.

As a result of the ROMP chemistry with norbornenyl reagents, a composition can be obtained that includes the following: a particle (e.g., silica or Co/C) and one or more high-load polymers coupled to the particle, the one or more high-load polymers having a siloxane (e.g., alkylsiloxane) linked to the particle and having a first norbornenyl reaction product; and a polymer coupled to the siloxane (e.g., alkylsiloxane) through a second norbornenyl reaction product linked through the first norbornenyl reaction product, the first and second norbornenyl reaction products resulting from a reaction between a first norbornenyl reactant and a second norbornenyl reactant, said polymer having a loadable functional substituent per monomer. The polymer is opposite of the particle with respect to the siloxane linker. The polymer extends by additional norbornenyl reactions to result in "n+1" norbornenyl reaction products for an "n" polymer.

The functional substituents can include one or more of: bis-acid chloride (BAC); dichlorotriazine (DCT); triphenyl phosphine (TPP); triazole phosphate (TP); carbodiimide (ACC); benzyl phosphate (BP); monoamine (MAm); monoethyl azodicarboxylate (MEAD); benzylethyl azodicarboxylate (BEAD); sulfonyl chloride (SC); benzenesulfonyl chloride (BCS); acetic acid (HAc); pyridine (Py); benzaldehyde (BA); chlorophosphate (PC); and Trimercaptotriazine (TMT). Other functional substituents can be used.

In one embodiment, a composition can include: a particle and one or more high-load polymers coupled to the particle, the one or more high-load polymers having a siloxane (e.g., alkylsiloxane) end linked to the particle; a cycloalkane (e.g., cyclopentane) coupled to siloxane opposite of the particle; and a polymer coupled to the cycloalkane (e.g., cyclopentane), each monomer of the polymer having a second cycloalkane (e.g., cyclopentane) group coupled to one or more loadable functional substituents.

In one embodiment, a composition can include: a particle and one or more high-load polymers (e.g., oligomers) coupled to the particle, the one or more high-load polymers having a siloxane (e.g., alkylsiloxane) linked to the particle; a first cycloalkane (e.g., cyclopentane) coupled to siloxane (e.g., alkylsiloxane) opposite of the particle and having an alkenylphenyl linked to one carbon of the first cycloalkane (e.g., cycloheptane); and a polymer (e.g., oligomer) coupled to another carbon of the first cycloalkane (e.g., cycloheptane), each monomer of the polymer having a functional substituent as described herein.

In one embodiment, the particle can be a silica particle. The PPHM including the silica particle can be included in silica gels. Silica gels offer several advantages over the traditional polystyrene based products: broad solvent compatibility, including polar solvents; minimal swelling, which facilitates the use in automated flow-through systems; ease of handling with no static charge, which simplifies the filling of cartridges and columns; thermal stability, which allows for use in microwave-assisted reactions; possible utilization in large-scale purification. The advantages of functionalized silica gels make them extremely well suited for use in flow-through systems. The development of continuous processing and flow-through systems is emerging as a method, which has the potential to revolutionize drug development and production. Continuous processing is expected to reduce production costs and improve environmental performance.

The utilization of PPHM as reagents/scavengers in parallel synthesis and reagent cartridges for continuous flow provides an example of the benefits of these hybrid materials. The PPHM can be used in automated synthesis, flow-through devices, microwave technology synthesis, as well as others.

The PPHM materials overcome problems with previous systems, such as: (i) low load levels (ii) low reaction kinetics due to heterogeneity and non-surface diffusion-controlled processes, (iii) unfavorable swelling characteristics of traditional resins used in immobilized reagent cartridges that result in backpressure, (iv) low solvent tolerance of traditional resins, (v) inefficient regeneration of reaction columns, and (vi) poor surface immobilization. As such, the PPHM can provide improvements in: (i) load levels (ii) reaction kinetics, (iii) reducing swelling characteristics to reduce backpressure, (iv) increasing solvent tolerance, (v) efficient regeneration of reaction columns, and (vi) improved surface immobilization.

Generically, the particle of the PPHM can be any particle, which can be represented by "Z" in the chemical structures provided herein, such as in Formula 1. The PPHM including the particle "Z" can be linked to a polymer through a generic linker identified as "Y" herein, such as in Formula 1. The polymer of the PPHM can be any functionalized polymer "FP" as described herein, such as in Formula 1. Thus, Formula 1 provides a generic representation of a PPHM. In Formula 1, "m" can be any integer, such as from 1 to 10,000,000, or from 1 to 1,000,000, or from 1 to 100,000, or from 1 to 10,000, or from 1 to 1,000, or from 1 to 500, or from 1 to 250, or from 1 to 100, or from 1 to 50, or from 1 to 25, or other range. The size of the particle "Z" can determine the integer for "m." The particle can range from 0.1 nm to 1 mm, or 0.25 nm to 500 microns, or from 0.5 nm to 100 microns, or from 0.75 nm to 50 microns, or from 1 nm to 1 micron, or from 10 nm to 500 nm, or from 25 nm to 100 nm, or from 50 nm to 75 nm.

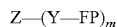

$$Z\text{—}(Y\text{—}FP)_m \qquad \text{(Formula 1)}$$

In order to facilitate preparation of the PPHM, the particle can be functionalized with a norbornenyl group, generating what is often referred to as a norbornenyl-tagged (e.g., Nb-tagged) particle. Formula 2A illustrates an Nb-tagged particle through a siloxane linker. Formula 2B illustrates an Nb-tagged particle through a siloxane group and a linker group "L." In Formulae 2A-2B, $R^1$ and $R^2$ can independently be hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof, as well as other well-known chemical substituents. The aliphatic groups can include carbon chains each independently being about 0-20, about 1-10, or about 1-5 carbons, which may be substituted with hetero atoms O, N, S, P, or the like. L can be any type of linker, such as having straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof, as well as other well-known chemical linkers and corresponding substituents. The linker L can be of any length as desired and reasonable.

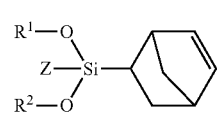

(Formula 2A)

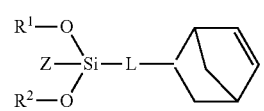

(Formula 2B)

(Formula 2C)

The functionalized polymer "FP" of Formula 1 can be prepared by polymerizing monomers that have norbornenyl groups. The monomers having the norbornenyl groups also include one or more functional groups "FG", such as generally shown in Formula 2C, where the functional group FG can be linked to the norbornenyl group by a single bond or by two bonds with the FG forming a ring with the norbornenyl group. Examples of the monomers having the norbornenyl group and functional group FG can include: norbornenyl-tagged bis-acid chloride (Nb-BAC); norbornenyl-tagged dichlorotriazine (Nb-DCT); norbornenyl-tagged triphenyl phosphine (Nb-TPP); norbornenyl-tagged phosphate triphenyl (Nb-PTP); norbornenyl-tagged di-triphenylphosphate (Nb-Di-TPP); norbornenyl-tagged triazole phosphate (Nb-TP); norbornenyl-tagged carbodiimide (Nb-ACC); norbornenyl-tagged alkyl-carbodiimide (Nb-alkyl-ACC); norbornenyl-tagged benzyl phosphate (Nb-BP); norbornenyl-tagged monoamine (Nb-MAm); norbornenyl-tagged monoethyl azodicarboxylate (Nb-MEAD); norbornenyl-tagged benzylethyl azodicarboxylate (Nb-BEAD); norbornenyl-tagged sulfonyl chloride (Nb-SC); norbornenyl-tagged benzenesulfonyl chloride (Nb-BCS); norbornenyl-tagged acetic acid (Nb-HAc); norbornenyl-tagged pyridine (Nb-Py); norbornenyl-tagged benzaldehyde (Nb-BA); norbornenyl-tagged chlorophosphate (Nb-PC); and norbornenyl-tagged trimercaptotriazine (Nb-TMT), some of which are shown below. Other functional group substituents can be used.

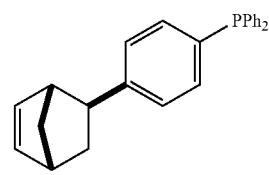

Nb-tagged Triphenylphosphine
Nb—TPP

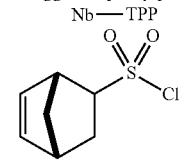

Nb-tagged Sulfonyl Chloride
Nb—SC

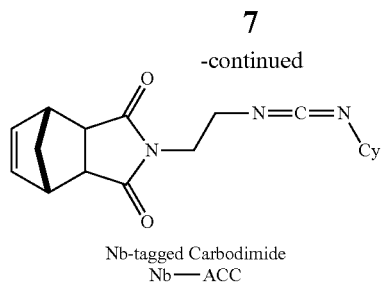

Nb-tagged Carbodimide
Nb—ACC

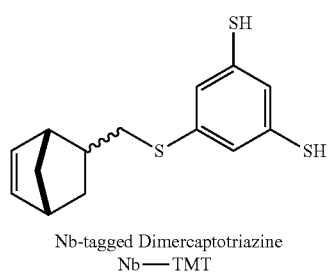

Nb-tagged Dimercaptotriazine
Nb—TMT

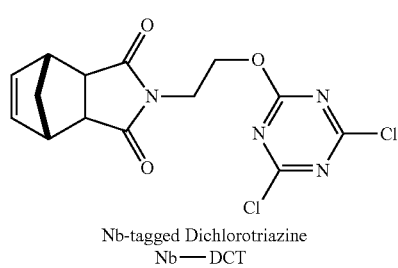

Nb-tagged Dichlorotriazine
Nb—DCT

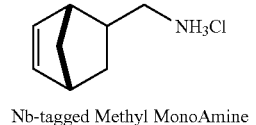

Nb-tagged Methyl MonoAmine
Nb—MMAm

Nb-tagged Bis-acid Chloride
Nb—BAC

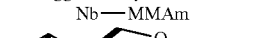

Nb-tagged Benzyl Phosphate
Nb—BP

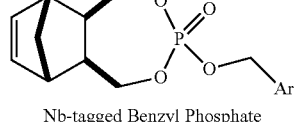

Nb-tagged Pyridine
Nb—Py

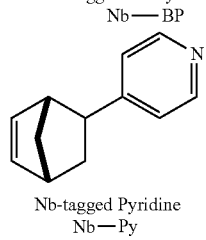

Nb-tagged Triazole Phosphate
Nb—TP

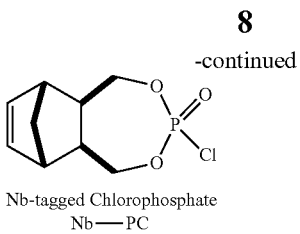

Nb-tagged Chlorophosphate
Nb—PC

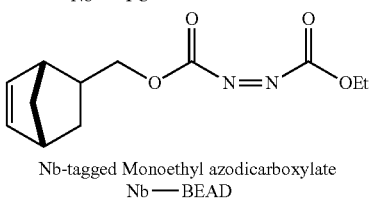

Nb-tagged Monoethyl azodicarboxylate
Nb—BEAD

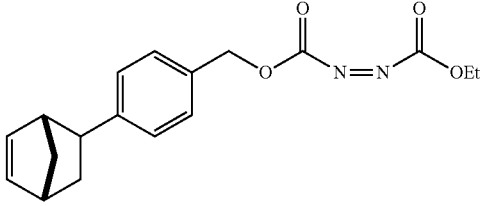

Nb-taggd benzylethyl azodicarboxylate
Nb—BEAD

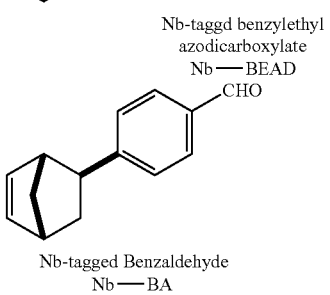

Nb-tagged Benzaldehyde
Nb—BA

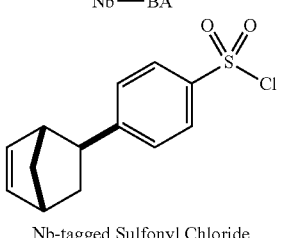

Nb-tagged Sulfonyl Chloride
Nb—SC

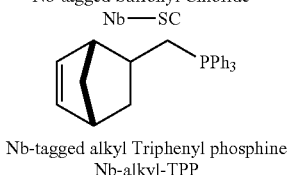

Nb-tagged alkyl Triphenyl phosphine
Nb-alkyl-TPP

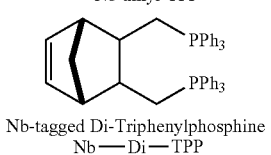

Nb-tagged Di-Triphenylphosphine
Nb—Di—TPP

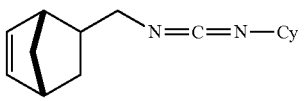

Nb-taggedAlkyl-Carbodiimide
Nb-Alkyl-ACC

The Nb-tagged particle (Formulae 2A-2B and Nb-tagged functional group (Formula 2C) can be reacted under conditions described herein for ROMP chemistry in order to produce the PPHM of the present invention. In one example, the PPHM can have the structure of Formula 3.

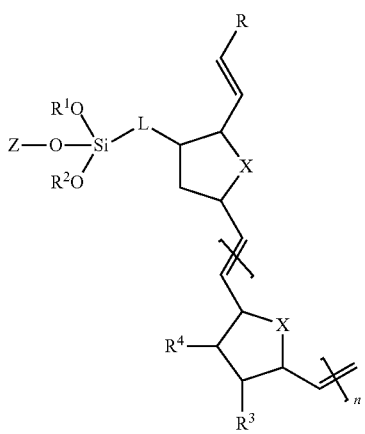

(Formula 3)

In Formula 3: Z can be any particle, such as silica or magnetic particle, or the like; L can be any linker, such as described above; each X can independently be carbon (C) or any hetero atom such as oxygen (O), nitrogen (N), sulfur (S), phosphorus (P), with the appropriate hydrogens (e.g., $CH_2$) or the like; R can be any hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof as well as other well-known chemical substituents; $R^1$ and $R^2$ can independently be hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof, as well as other well-known chemical substituents; and $R^3$ and $R^4$ can independently or in combination include a substituent having a functional group. The aliphatic groups can include carbon chains, each independently being about 0-20, about 1-10, or about 1-5 carbons, which carbons may be substituted with hetero atoms O, N, S, P, or the like.

In one embodiment, the substituent having a functional group for $R^3$ and $R^4$ can independently or in combination include hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof, so long as a functional group is included in order to function in processes described herein. When in cooperation, $R^3$ and $R^4$ can cooperate to form a ring structure that includes the functional group. When independent, $R^3$ and $R^4$ can both include functional groups, or one can be a hydrogen with the other including the functional group.

In one example, $R^3$ and $R^4$ can cooperate to form a ring having a phosphate, where the phosphate group can be substituted or unsubstituted and may or may not have another functional group coupled thereto as a substituent (e.g., benzyl phosphate, BP). As such, $R^3$ and $R^4$ can cooperate to form a benzyl phosphate. One example of $R^3$ and $R^4$ cooperating can include formation of 2-((benzyl)oxy)-1,3,2-dioxaphosphepane 2-oxide, which may or may not be substituted with $R^5$ as shown in Formula 4. In Formula 4, the loose ends couple to the cyclopentyl group of the polymeric backbone. $R^5$ can include hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof, as well as other well-known chemical substituents.

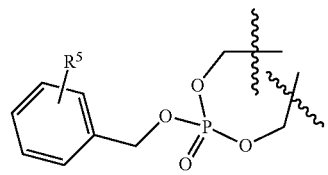

Formula 4

In another example, $R^3$ and $R^4$ can cooperate to form a ring having a phosphate that is linked to a triazole so as to be a triazole phosphate, which may or may not be substituted (e.g., triazole phosphate; TP). One example of $R^3$ and $R^4$ cooperating can include the formation of 2-((1-methyl-1H-1,2,3-triazol-4-yl)methoxy)-1,3,2-dioxaphosphepane-2-oxide, which may or may not be substituted with $R^5$ as shown in Formula 5. In Formula 5, the loose ends couple to the cyclopentyl group of the polymeric backbone. $R^5$ can be as defined in connection with Formula 4.

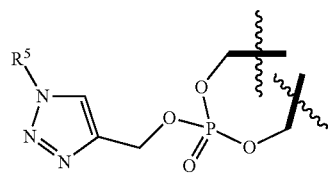

Formula 5

In one example, $R^3$ and $R^4$ can cooperate to form a pyrrolidine-2,5-dione substituent that may or may not be further substituted (e.g., diclorotriazine; DCT). When further substituted, the nitrogen of the pyrrolidine-2,5-dione can be linked to a substituent, such as $R^5$ as described herein. The pyrrolidine-2,5-dione may be linked to a dichlorotriazine, such as shown in Formula 6, so that $R^3$ and $R^4$ can cooperate to form 1-(2-((4,6-dichloro-1,3,5-triazin-2-yl)oxy)ethyl)pyrrolidine-2,5-dione. In Formula 6, the loose ends couple to the cyclopentyl group of the polymeric backbone. $R^5$ can be as defined in connection with Formula 4.

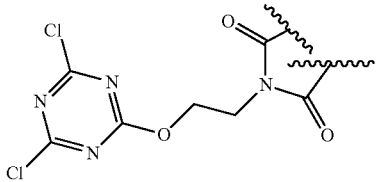

Formula 6

In another example, $R^3$ and $R^4$ can cooperate to form a pyrrolidine-2,5-dione substituent that is further substituted with a carbdiimide group such as shown in Formula 7, so that $R^3$ and $R^4$ can cooperate to form 1-((((cyclohexylimino)methylene)amino)methyl)pyrrolidine-2,5-dione (e.g., carbdiimide; ACC). In Formula 7, the loose ends couple to the cyclopentyl group of the polymeric backbone. $R^5$ can be as defined in connection with Formula 4.

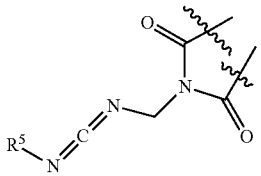

Formula 7

In another example, $R^3$ and $R^4$ can cooperate to form a pyrrolidine-2,5-dione substituent that is further substituted with an acrylate group such as shown in Formula 8, so that $R^3$ and $R^4$ can cooperate to form 2,5-dioxopyrrolidine-1-yl acylate (e.g., dioxyopyrrolidin-1-yl acetate; DA). In Formula 8, the loose ends couple to the cyclopentyl group of the polymeric backbone. $R^5$ can be as defined in connection with Formula 4.

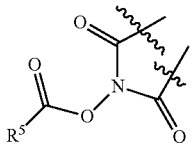

Formula 8

In another example, $R^3$ and $R^4$ can cooperate to form a pyrrolidine-2,5-dione substituent that is further substituted with a bis-acid chloride group such as shown in Formula 9, so that $R^3$ and $R^4$ can cooperate to form acetyl chloride (e.g., bis-acid chloride; BAC). In Formula 9, the loose ends couple to the cyclopentyl group of the polymeric backbone.

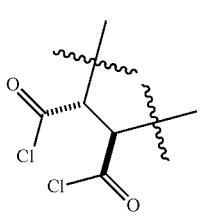

Formula 9

In one embodiment, one of $R^3$ or $R^4$ is a hydrogen and the other includes a functional group as described herein, or both $R^3$ or $R^4$ are the same functional group or different functional groups.

In one embodiment, one of $R^3$ or $R^4$ is hydrogen and the other includes: a triphenylphosphine (e.g., TP) such as is shown in Formula 10; a pyridine (e.g., (Py) such as is shown in Formula 11; a 6-(benzylthio)-1,3,5-triazine-2,4-dithiol (e.g., trimercaptotriazine; TMT) such as is shown in Formula 12; a methyl amine like methylamine hydrochloride (e.g., methylamine; MAm) such as is shown in Formula 13; a benzylethyl azodicarboxylate like (E)-1-Alkyl 2-(4-methylbenzyl) diazene-1,2-dicarboxylate (e.g., benzylethyl azodicarboxylate; BEAD) such as is shown in Formula 14; a benzylsulfonyl chloride such as benzenesulfonyl chloride (e.g., BSC) such as is shown in Formula 15; a diclorotriazine like ethyldichlorotriazine (e.g., ODCTG2) such as is shown in Formula 16; or combinations thereof.

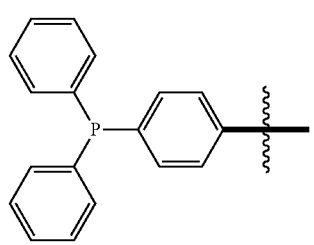

Formula 10

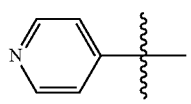

Formula 11

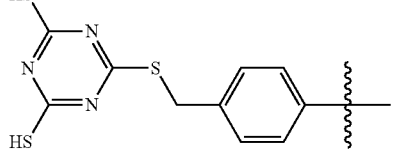

Formula 12

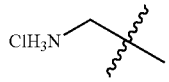

Formula 13

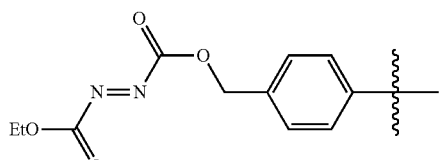

Formula 14

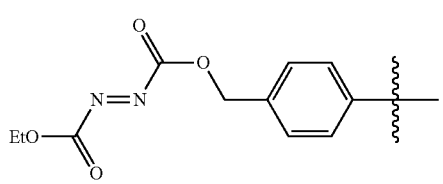

Formula 15

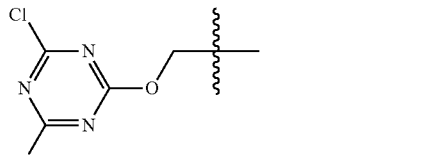

Formula 16

The foregoing substituents can be incorporated into the PPHM substances. Examples of PPHM substances are shown below in Formulae 17-19, where: Z is a nanoparticle; $R^5$ is as described herein; and n is from 1 to 1,000, or from 10 to 500, or from 25 to 250, or from 50 to 100. In all of the formulae herein with "Z" as the particle, the particle Z can include one or more polymers linked thereto.
Formula 17
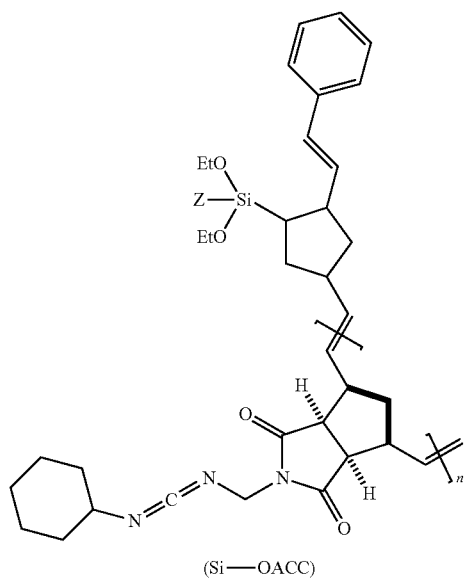
(Si—OACC)
Formula 18
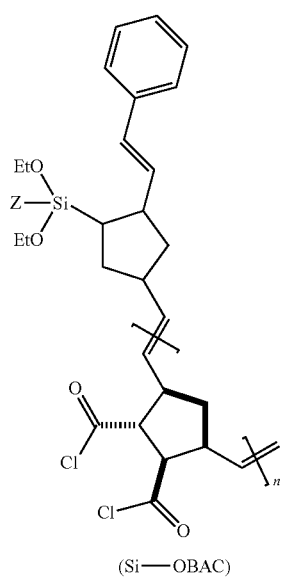
(Si—OBAC)
Formula 19
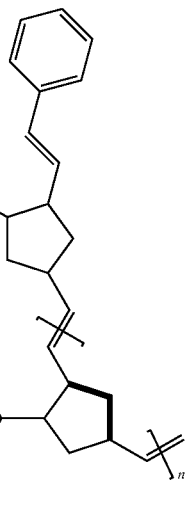
(Si—OBEAD)
Formula 20
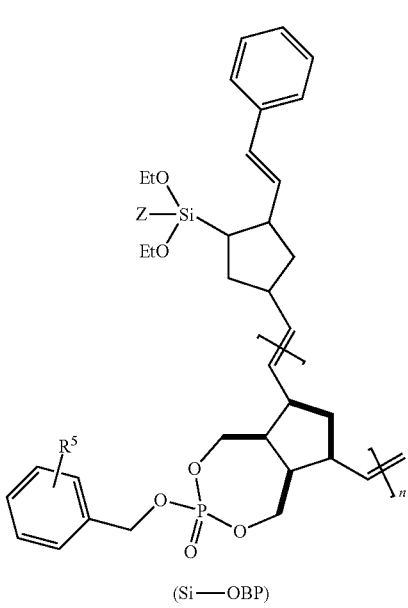
(Si—OBP)
Formula 21
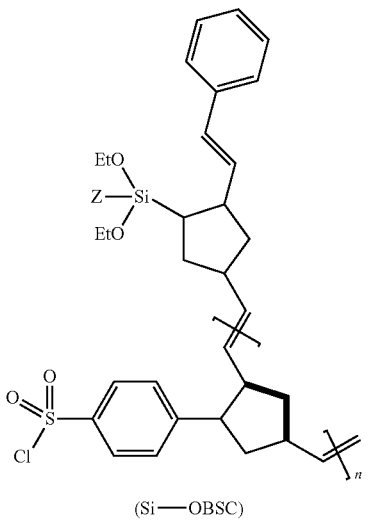
(Si—OBSC)

Formula 22
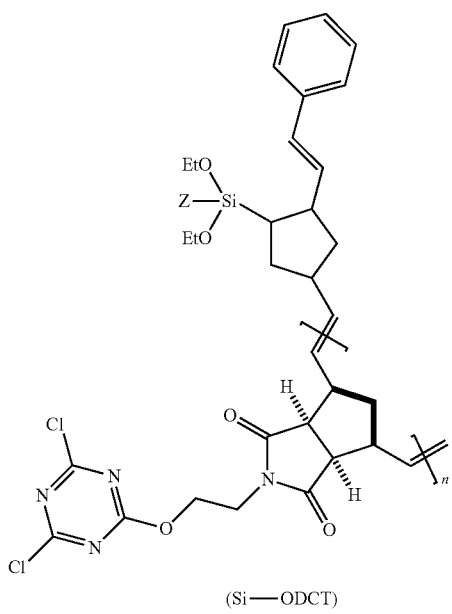
(Si—ODCT)
Formula 23
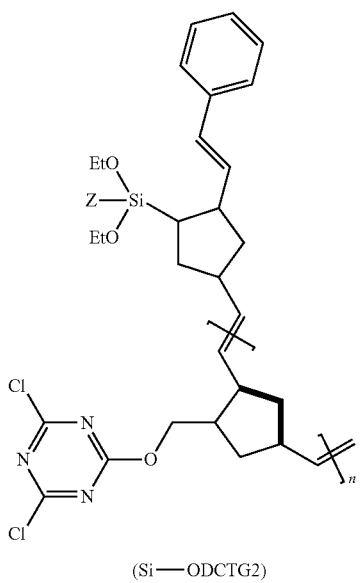
(Si—ODCTG2)
Formula 24
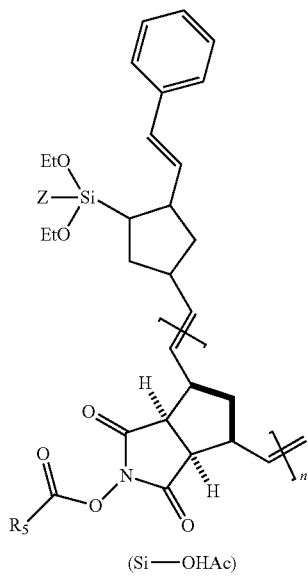
(Si—OHAc)
Formula 25
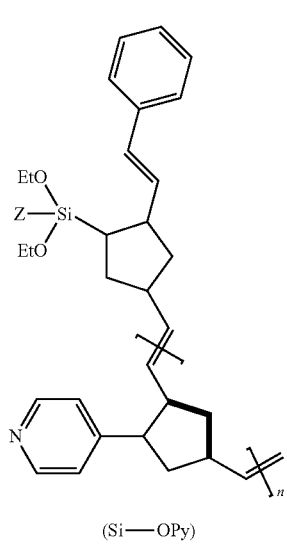
(Si—OMAm)
Formula 26
(Si—OPy)

-continued

Formula 27

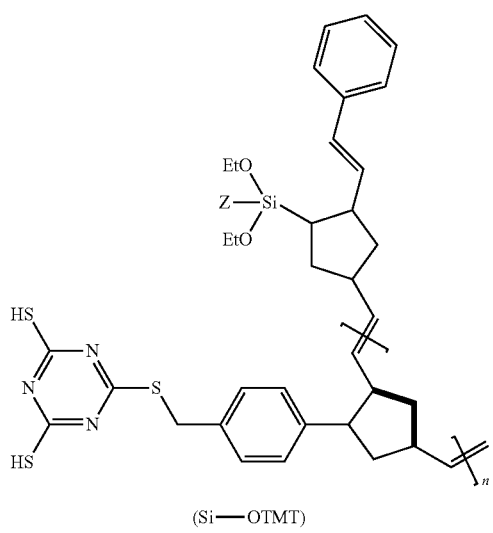

(Si—OTMT)

Formula 28

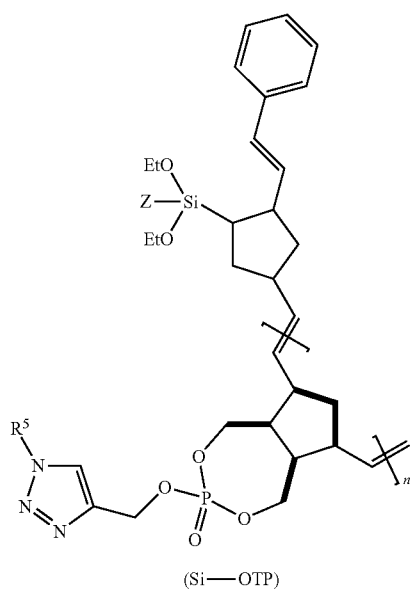

(Si—OTP)

Formula 29

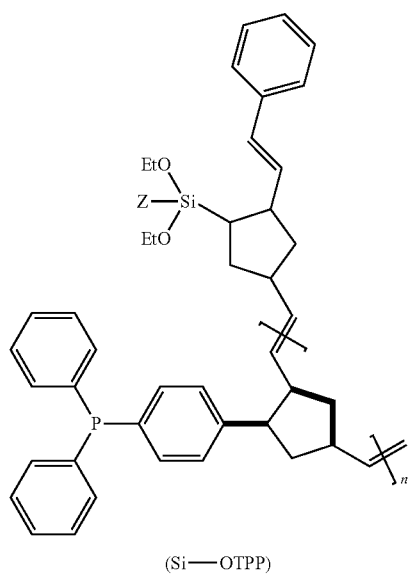

(Si—OTPP)

The PPHM described herein have high functional group loadings per gram of material. The number of monomers "n" can determine the loading. For example, Si—OBAC$_{100}$ has 5.3 mmol/g load (where the subscript 100 indicates n=100), Si—OBAC$_{50}$ has a load of 2.74 mmol/g, Si—ODCT$_{100}$ has 3.7 mmol/g load, Si—ODCT$_{50}$ has a load of 2.79 mmol/g, Si—OTPP$^{100}$ has 2.3 mmol/g load, Si—OTPP$_{50}$ has a load of 1.36 mmol/g, Si—OACC$_{100}$ has 2.1 mmol/g load.

These PPHM are useful as scavengers (e.g., Si—OBAC, Si—OMAm, Si—ODCT, Si—OTTP, Si—OTMT), coupling reagents (e.g., Si—ODCT, Si—OACC), and diversifying reagents (e.g., Si—OTP, Si—OBP) in the synthesis of small molecule libraries in automated parallel synthesis and flow-through platforms.

The ROMP reactions that form the PPHM as shown in the formulae can be conducted with catalysts. Examples of some of the catalysts that can facilitate ROMP reactions with the norbornenyl-tagged reagents can include cat-A, cat-B, cat-C, cat-D, and cat-E as shown below. Particular catalyzed ROMP reactions are provided in the Experimental section below.

cat-A

cat-B

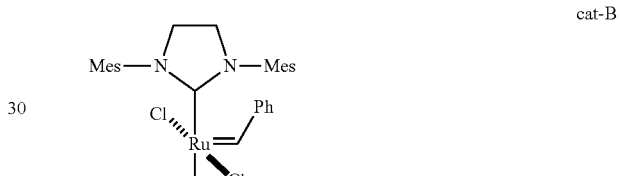

cat-C

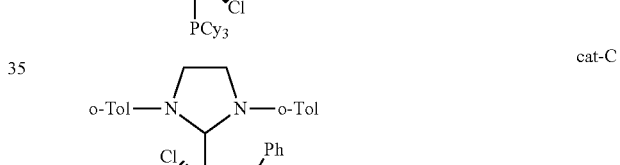

cat-D

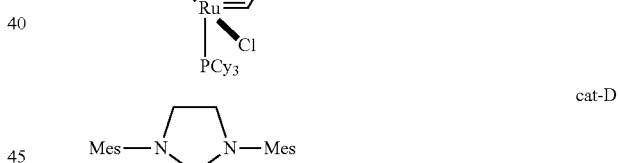

cat-E

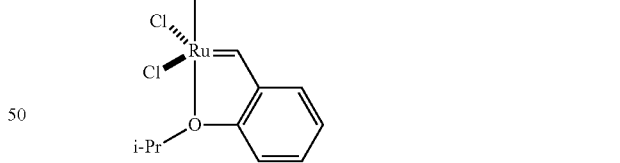

Figure 6:
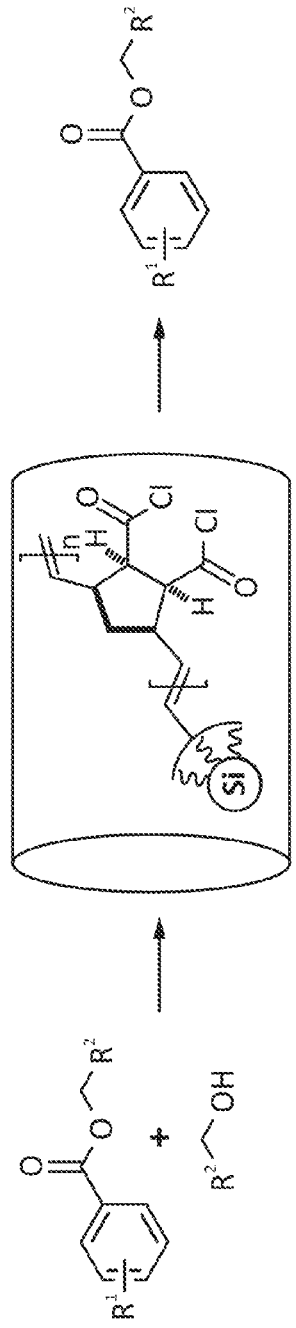
FIG. 6 illustrates a schematic representation of a column having a silica-hybrid material.

FIG. 6 provides an illustration of the scavenging that can be performed with Si—OBAC to scavenge an alcohol. For example, an esterification reaction utilizing 1.5 equivalents of alcohol was run in a batch reactor and then transferred to a syringe pump and flowed through a cartridge packed with Si—OBAC at 10 ml/h at room temperature to scavenge the excess alcohol. Analysis of the crude reaction after scavenging in flow indicated the product to be >95% pure, demonstrating the successful application of Si—OBAC in a flow application.

The proposed PPHM technology has further applications in the sequestration of Nb-tagged reagents that are utilized in key parallel transformations. The sequestration process can be applied with just metathesis catalyst resulting in the production of corresponding oligomer; thus, all Nb-tagged entities can be sequestered by the simple addition of a catalyst. Alternatively, activation of an Nb-tagged surface with catalyst places the Ru-alkylidene on the surface, effectively generating a catalyst-armed surface ("CAS") from which sequestration of all Nb-tagged entities can take place. Both scenarios represent chromatography-free protocols ideally suited for parallel synthesis.

Figure 7:
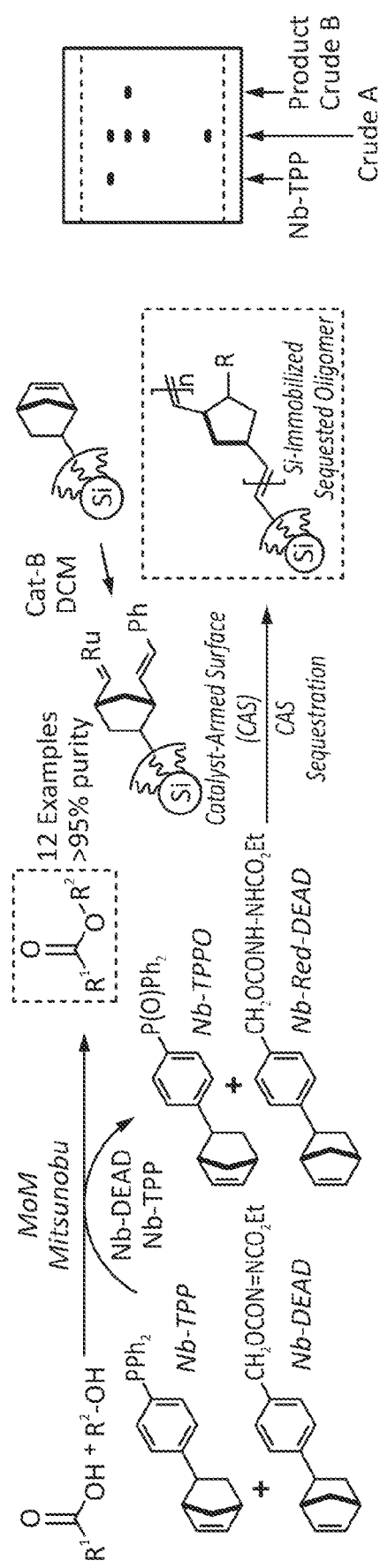
FIG. 7 includes a schematic representation of a scheme for preparing a particle-polymer hybrid material.

FIG. 7 shows an example where Nb-TPP and Nb-DEAD monomeric reagents were used in a Mitsunobu reaction, followed by sequestration of the corresponding monomeric reagents/spent-monomers from the crude reaction mixture with catalyst armed Si-particles. Upon completion of the Mitsunobu reaction, the crude reaction mixture comprises five components, namely: (i) the desired product, (ii) excess Nb-TPP, (iii) excess Nb-DEAD, (iv) oxidized Nb-TPP (Nb-TPPO) and (v) reduced Nb-DEAD. Isolation of the product and removal of the other four Nb-tagged monomeric species can be efficiently achieved via ROMP-sequestration utilizing a CAS.

In this process, the crude reaction mixture is poured into a solution containing Nb-tagged Si-particles that have been armed on the surface with a Ru-alkylidene generated by addition of the metathesis catalyst. Upon addition of the crude material, the CAS sequesters undesired monomers by polymerizing each monomer off the particle forming a surface-grafted oligomer, essentially phase trafficking them out of solution. Simple filtration of this mixture via a Celite® SPE yields desired product in the eluent at >90% purity.

Figure 8:
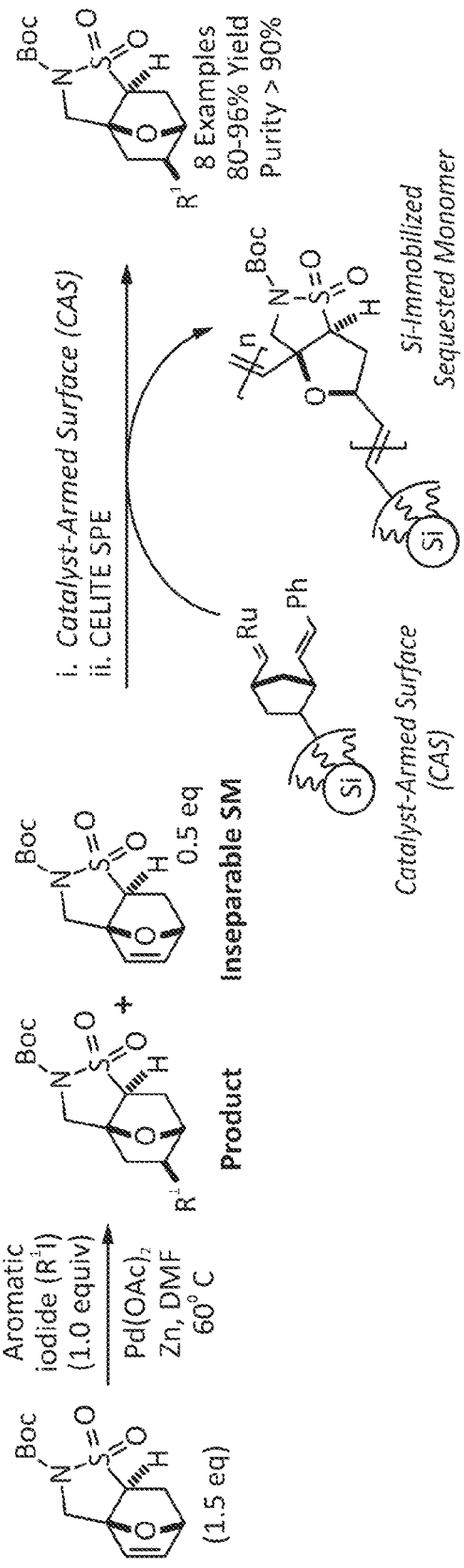
FIG. 8 includes a schematic representation of a scheme for sequestration of the excess Nb-tagged scaffold which was achieved using ROMP polymerization.

Additional utilization of this sequestration technology was previously demonstrated in a ROMP-based protocol for the sequestration of excess the intramolecular Diels-Alder-derived (IMDA-derived) scaffold for the synthesis of sultams. Findings have shown that excess scaffold (precious component) was required to drive the reductive Heck transformation to completion. However, the inseparable SM could not be separated from the desired product using standard column chromatography. In order to circumvent this problem, sequestration of the excess Nb-tagged scaffold was achieved using ROMP polymerization with either metathesis cat-B or the aforementioned catalyst-armed Nb—Si particles (see FIG. 8).

Figure 9:
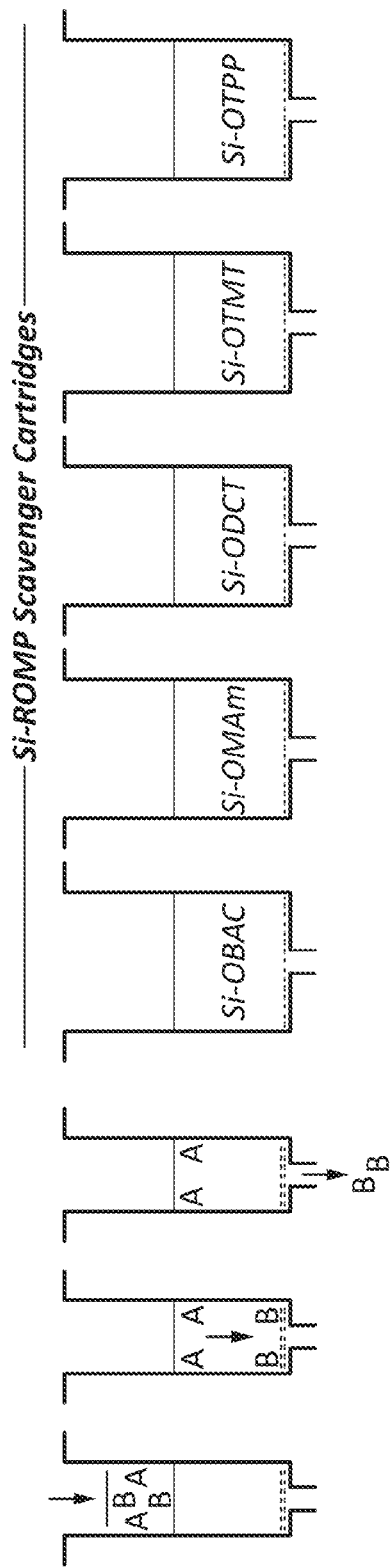
FIG. 9 includes a schematic representation of a scheme for scavenger cartridges having particle-polymeric hybrid nano-materials.

Additionally, the PPHM can be used in pre-packed, gravity-fed SPE cartridges as shown in FIG. 9. The SPE cartridges can be packed with the PPHM scavengers such as Si—OBAC, Si—OMAm, and Si—OTMT, or others, which can be used for purification of multiple crude reactions in parallel via scavenging. As shown, the crude reaction (A+B) is introduced to the SPE, and gravity feeds the crude reaction solution through the SPE, which allows the PPHM packed in the cartridge to remove the impurity from the crude material (A) and leaves the product (B) to elute from the SPE in high crude purity. This method for purification is routinely used in automated robotic platforms.

Figure 10:
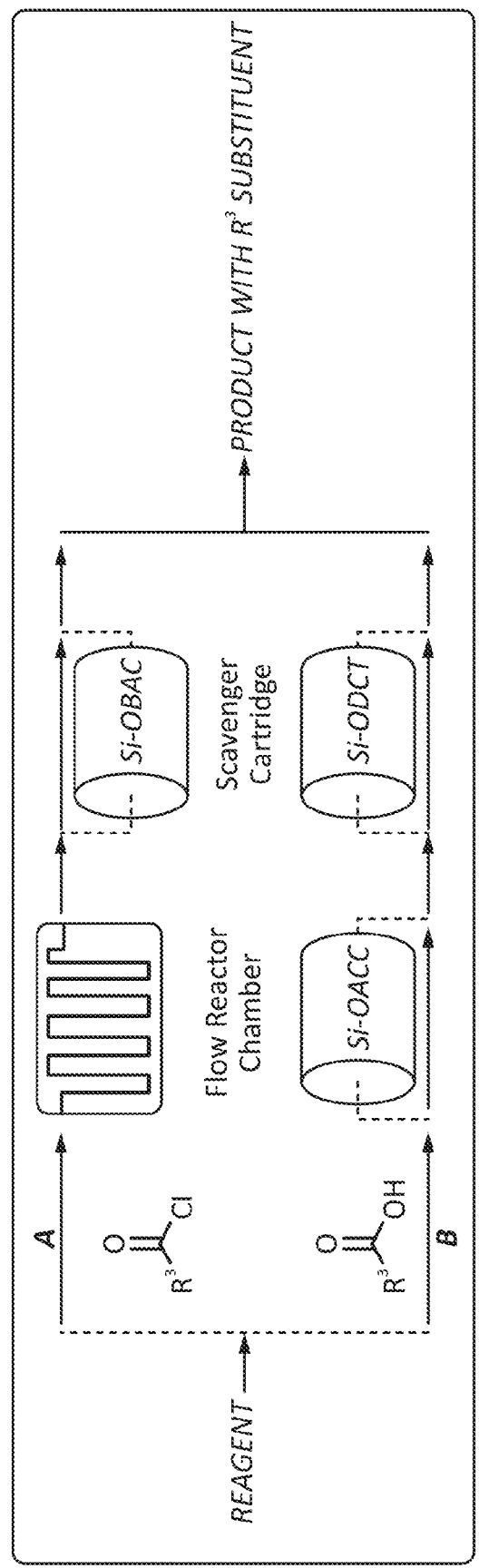
FIG. 10 includes a schematic representation of an embodiment of a scheme for scavenger cartridges having particle-polymeric hybrid nano-materials for use with a flow-reaction chamber.

FIG. 10 illustrates an embodiment of a reactor system that uses the functionalized cartridges for a reaction for diversification of a variety of isothiazolidines via two separate pathways (e.g., Pathway A and Pathway B). Simple esterification with a variety of acid chlorides can yield the desired product in high purity applying in-line purification via a Si—OBAC cartridge to remove excess scaffold as shown in Pathway A. Also, this can be done utilizing a Si—OMAm cartridge to scavenge excess acid chloride. Pathway B uses two PPH SPEs in series.

Figure 11:
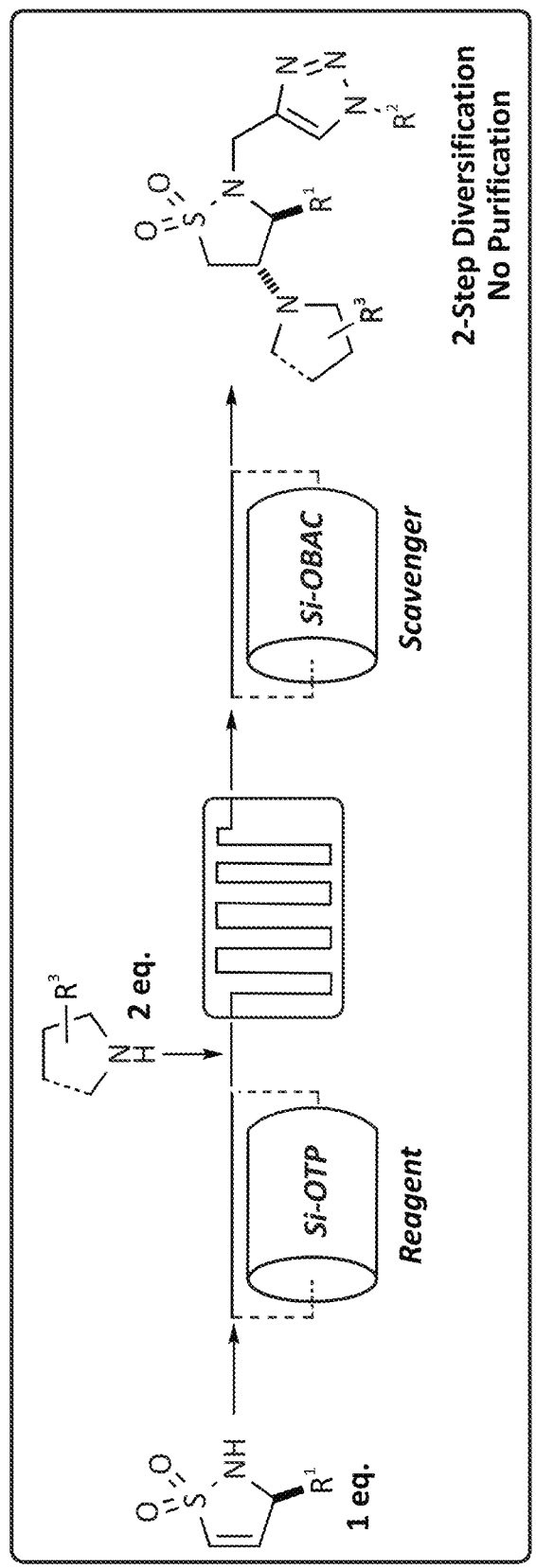
FIG. 11 includes a schematic representation of an embodiment of a scheme for scavenger cartridges having particle-polymeric hybrid nano-materials for use with a flow-reaction chamber with 2-step diversification and no purification.

FIG. 11 illustrates an embodiment of a reactor system that uses the functionalized cartridges so that a variety of acids can be implemented to diversify the core scaffold. This can be accomplished using a Si—ODCT cartridge as an immobilized coupling reagent in combination with a Si—OBAC scavenger cartridge to yield a library of isothiazolidines. For example, diversification of a dihydroisothiazole 1,1-dioxide scaffold can be performed utilizing a 3-step protocol in a continuous flow process. This method initiates by flowing the scaffold into a heated Si—OTP cartridge to triazolate the free N—H of the scaffold, followed by the addition of a variety of amines to undergo an aza-Michael diversification reaction which subsequently flows through a Si—OBAC scavenger cartridge to yield a library of the desired products in an overall reaction that occurs with high yield and purity. Additionally, for every set of amines used, the number of compounds can be multiplied by changing the derivative in the Si—OTP cartridge or by splitting the inlet of the scaffold through multiple cartridges in parallel.

Figure 12:
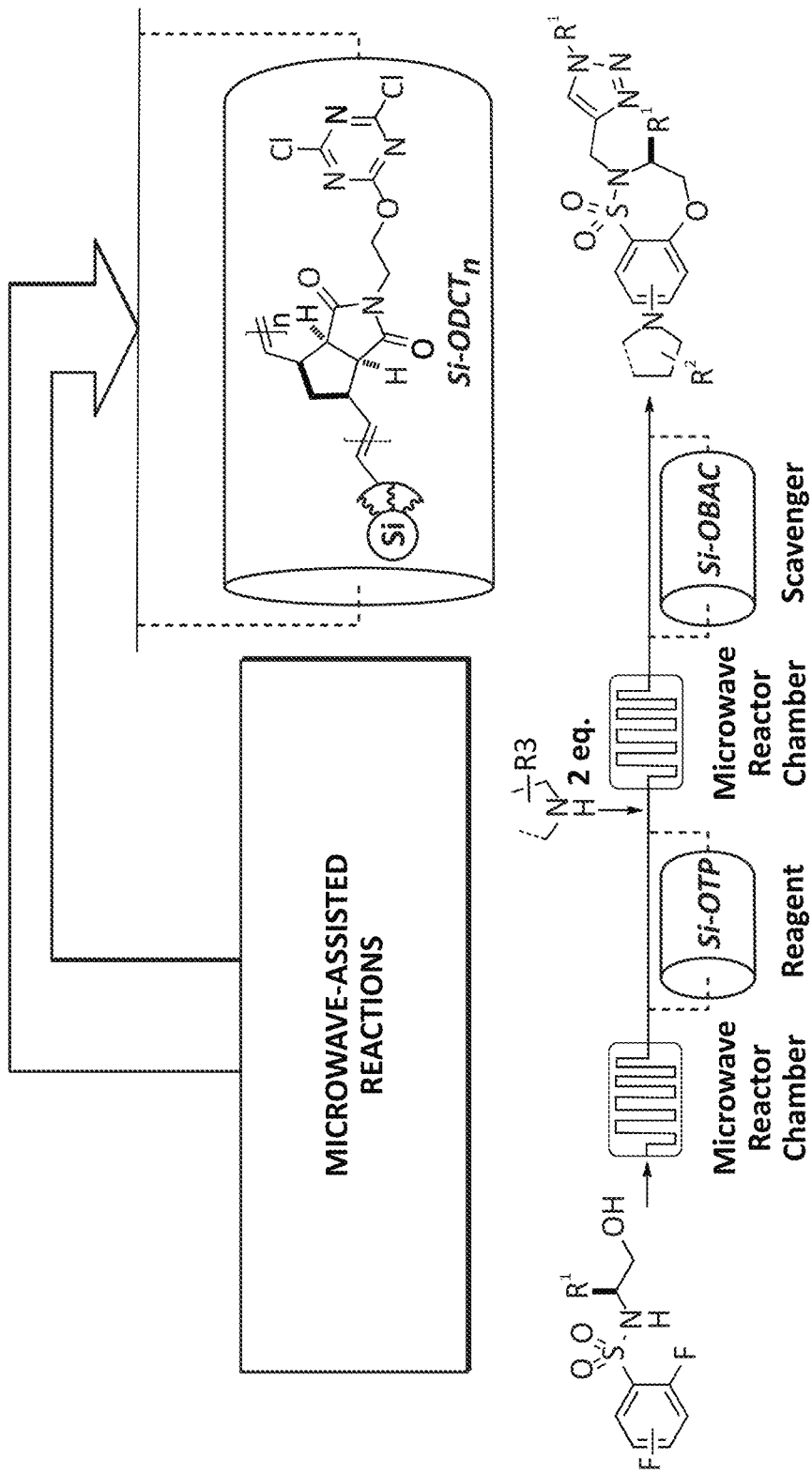
FIG. 12 includes a schematic representation of an embodiment of a scheme for scavenger cartridges having particle-polymeric hybrid nano-materials for use with a microwave reaction chamber.

FIG. 12 shows an example of another reactor system scheme that uses microwave assisted synthesis. This can combine the synthesis of the desired isothiazolidine scaffold in flow via a microwave-assisted intramolecular $S_NAr$, followed by a two-step diversification utilizing triazolation of the free N—H employing a Si—OTP cartridge, followed by the addition of a variety of amines to undergo facile microwave-assisted $S_NAr$ diversification of the core. Finally, the crude reaction will be purified in flow via a Si—OBAC cartridge to a dispenser in a fully automated process.

Figure 13:
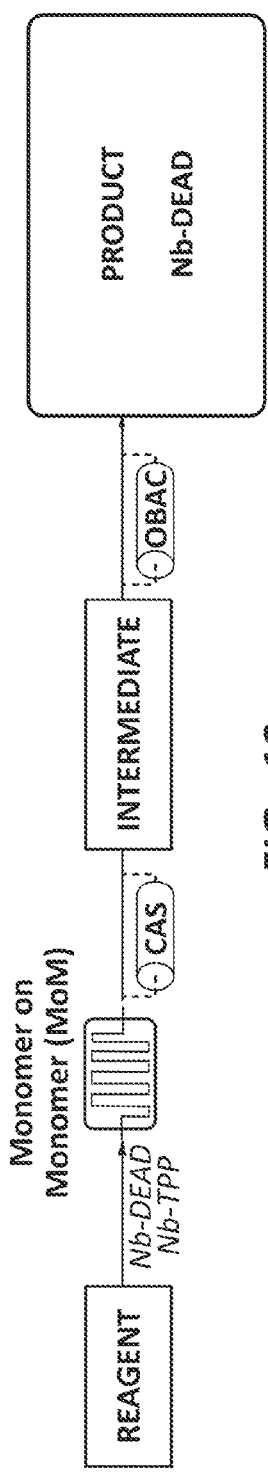
FIG. 13 includes a schematic representation of an embodiment of a scheme for scavenger cartridges having particle-polymeric hybrid nano-materials for use with a monomer-on-monomer (MoM) reaction chamber.

FIG. 13 shows another reactor system scheme, where the PPHM can be used in monomer-on-monomer (MoM) Mitsunobu reactions. In this regard, application of MoM Mitsunobu reaction in flow, followed by in-line purification, will be investigated followed by coupling to a second stage diversification such as aza-Michael with a variety of amines followed by flow-through a Si—OBAC scavenger cartridge to yield a collection of the desired products in high yields and purity.

Figure 14:
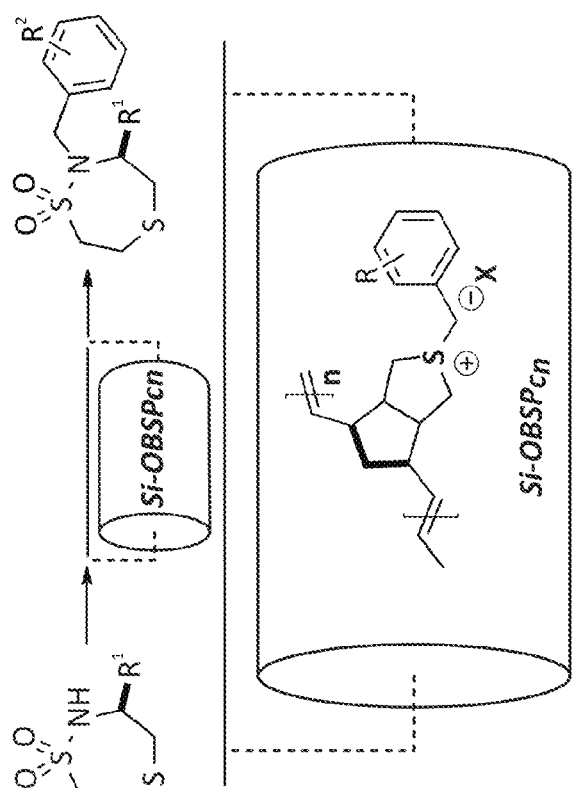
FIG. 14 includes a schematic representation of an embodiment of a scheme for regeneration of particle-polymeric hybrid nano-material functionalized flow cartridges.
Figure 14:
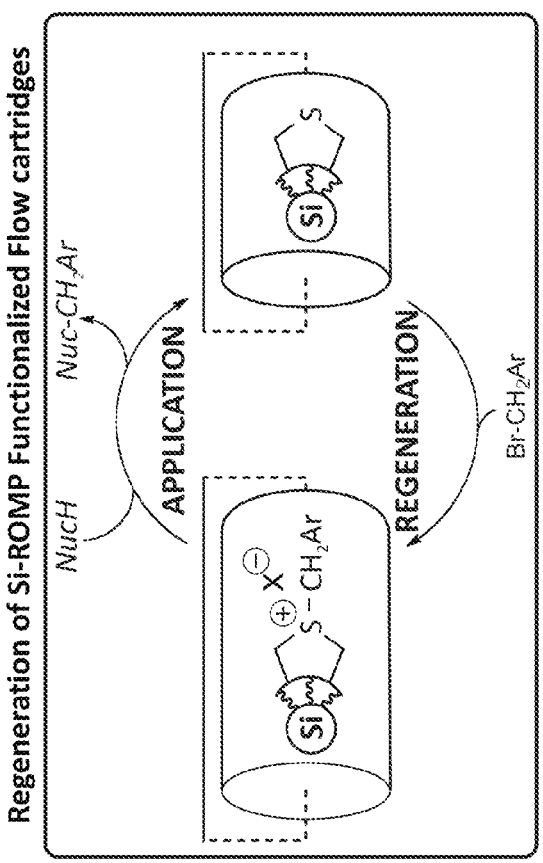

In addition to application of the PPHM cartridges in flow, the regeneration of spent PPHM cartridges can be performed as shown in FIG. 14. In the case of the immobilized benzylation reagents Si—OBP and Si—OBS, regeneration of spent cartridges not only allows for the re-use of spent cartridges but also the ability to change the corresponding benzyl group attached, giving access to generate a diverse set of Si—OBP and Si—OBS derivatives for in-line functionalization.

Furthermore, the PPHM, such as those in cartridges, can be employed in diversity-generating reactions, such as acid coupling, alkylations/benzylations, sulfonylations, acylations, Mitsunobu alkylations, and various other reactions.

Experimental

General Procedures and Reagents

All air and moisture sensitive reactions were carried out in flame- or oven-dried glassware under argon atmosphere using standard gastight syringes, canellas, and septa. $CH_2Cl_2$ and toluene were purified by passage through a Solv-Tek (www-.solvtek.com) purification system employing activated $Al_2O_3$ and degassed with argon. Flash column chromatography was performed with $SiO_2$ (Sorbent Technologies 30930M-25, Silica Gel 60 Å, 40-63 μm). Thin layer chromatography was performed on silica gel 60F 254 plates. Visualization of TLC spots was effected using KMnO₄ stain. ¹H and ¹³C NMR spectra were recorded in CDCl₃ (unless otherwise mentioned) on a Bruker DRX-500 spectrometer operating at 500 MHz, and 125 MHz, respectively and calibrated to the solvent peak. High-resolution mass spectrometry (HRMS) was recorded on a LCT Premier Spectrometer (Micromass UK Limited) operating on ESI (MeOH). The nanoparticles were analyzed by scanning electron microscopy (Hitachi S-2700 equipped with a quartz PCI digital capture) and FTIR Perkin Elmer Spectrum 100 FT-IR spectrometer. All other commercially available compounds were used as received. Metathesis catalyst [(IMesH$_2$)(PCy$_3$)(Cl)$_2$Ru=CHPh; cat-B] was provided by Materia Inc., and used without further purification. Deuterated solvents were purchased from Cambridge Isotope laboratories.

Section 1

Synthesis of a hybrid silica-oligomeric material was performed as shown in Scheme 1 below, whereby Nb-tagged silica could be activated with Grubbs catalyst to initiate the polymerization of the OBAC monomer (Compound 3) from the silica particle surface. Activated spherical silica (Compound 1) (70 Å, 20 μm particle size) was tagged with 5-(bicycloheptyl)-triethoxy silane, followed by capping with trimethoxymethylsilane and dimethoxydimethylsilane, to yield the desired Nb-tagged silica (Si—Nb) (Compound 2). With this tagged nanoparticle in hand, the surface was armed with metathesis catalyst [(IMesH2)(PCy$_3$)(Cl)$_2$Ru=CHPh; cat-B] (0.6-0.8 equivalents), followed by addition of the Nb-tagged, OBAC monomer (Compound 3) to rapidly generate the desired hybrid material Si—OBAC$_{50}$ (Compound 4). Pre-arming of the silica surface with 0.8 equivalents of cat-B before the addition of the Nb-tagged monomeric species can facilitate the reaction scheme. Metathesis catalyst was attached from the Nb-tagged silica surface and potentially prevented polymerization of the Nb-tagged monomer (Compound 3) by any free catalyst in solution.

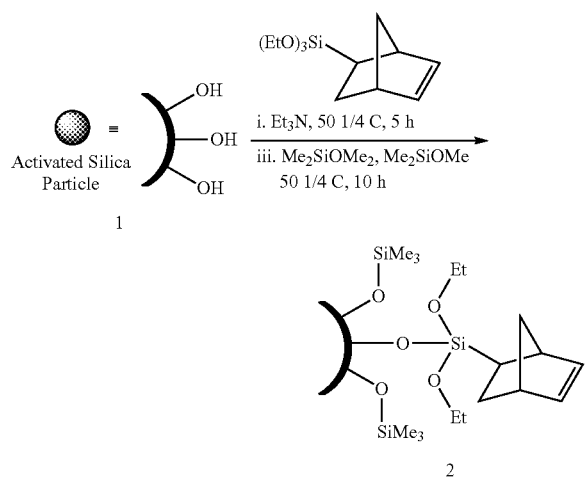

Scheme 1

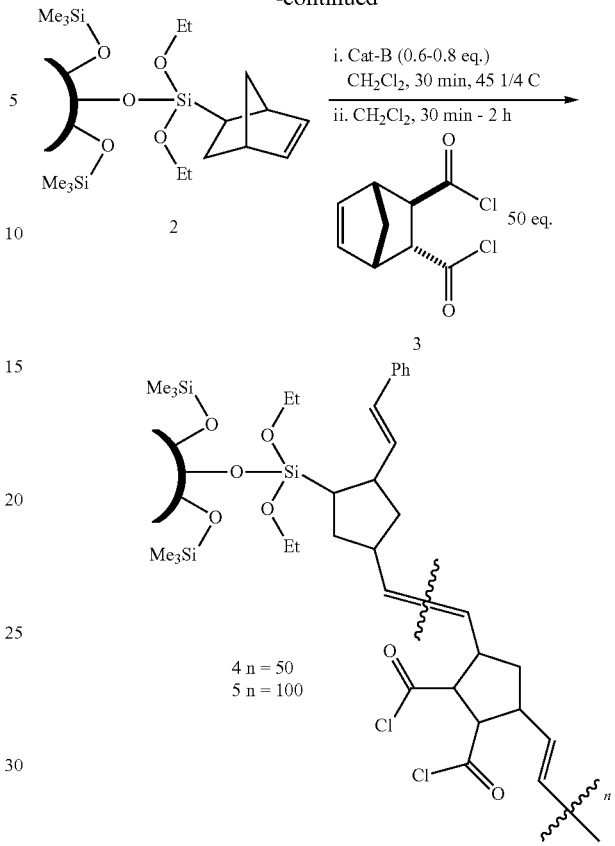

Silica-particles can be reacted with 5-(Bicycloheptenyl)-triethoxysilane to yield Compound 2. Spherical silica (50 g) [70 Å, 20 μm particle size] was heated under vacuum at 200° C. for 48 hours. After such time, the silica was cooled to 0° C. under Ar and suspended in dry DCM (0.46M, 150 cm³). To this, stirring slurry was added 5-(bicycloheptenyl)-triethoxysilane (15.0 g, 58.4 mmol), and the reaction was heated at 50° C. for 24 hours. Trimethoxymethylsilane (12 cm³, 84.1 mmol) and dimethoxydimethylsilane (8 cm³, 57.4 mmol) were added to the crude reaction mixture, which was heated at 50° C. for an additional 30-40 hours. Upon completion the crude reaction was filtered, washed with CH$_2$Cl$_2$ (4×50 cm³), collected and dried under vacuum to yield Si—Nb (Compound 2) (average load=5×10⁻⁵ mol).

Norbornenyl monomers (Compounds 3, 7 and 8) can be linked to the particle via surface-initiated ROMP from Si—Nb (Compound 2). To a stirring suspension of norbornenyl-tagged silica particles Si—Nb (Compound 2) (1 eq.) in dry CH$_2$Cl$_2$ (0.016M), was added cat-B (0.6-0.8 equiv.). The reaction mixture was heated at 45° C. for 30 minutes, and added to a solution of Nb-monomer (50 equiv. for 50-mer) in dry CH$_2$Cl$_2$. The reaction mixture was heated further for 30 minutes-2 hours, and monitored via TLC for disappearance of SM. After such time, the reaction was cooled to room temperature, whereby the reaction was quenched by addition of ethyl vinyl ether (EVE) (5-10 drops). The crude reaction was filtered, washed with CH$_2$Cl$_2$ (4×), dried under vacuum, and grounded to a fine powder, when required to yield the desired hybrid material as an off white, free flowing powder. The theoretical Load calculation is as follows: Si—OBAC$_{100}$ (Compound 5): 2.37 g hybrid material=1.37 g OBAC+1.0 g Silica, divide by 1.37=1.0 g OBAC+0.729 g Silica, OBAC load=9.1 mmol/g, Therefore, Si—OBAC$_{100}$ load=9.1 mmol/(1.0 g OBAC+0.729 g Silica),=9.1 mmol/1.729 g,=5.26 mmol/g.

The load increase for the PPHM is a property of the polymer length grafted off of the silica surface, which can be shown in all cases to increase (FIG. 2), i.e. Si—OBAC 50-mer with a load of 2.74 mmol/g can be increased to 5.26 mmol/g by simply increasing the size of the oligomer to the corresponding 100-mer. When compared to current commercially available Si-immobilized scavengers (0.7-1.2 mmol), a significant increase in load is observed. In addition to increased load, the successful utilization of both Si—OBAC$_{50}$ as an effective scavenger and Si—ODCT$_{50}$ as an efficient immobilized coupling reagent in standard reaction vessels was accomplished (FIG. 3).

Figure 2A:
FIG. 2 provides two SEM images of Si—OBAC$_{100}$ (right) and Si—OBAC$_{50}$ (left)
Figure 2B:
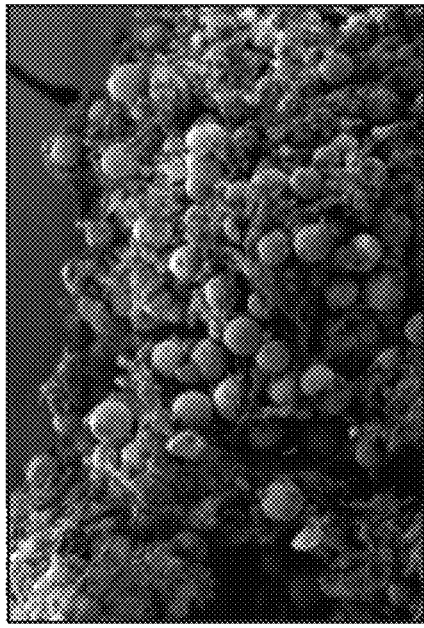
Figure 3A:
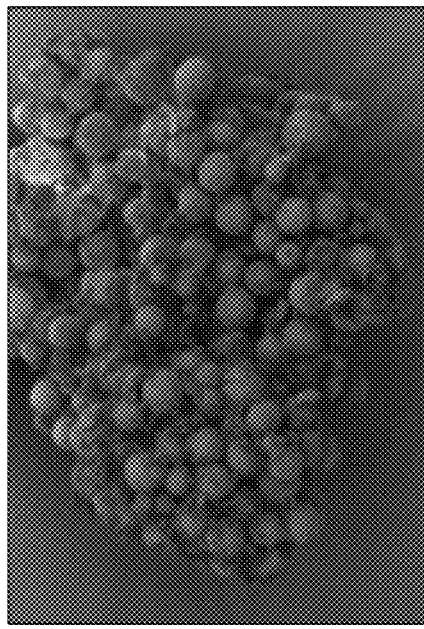
FIG. 3 provides two SEM images of Si—ODCT$_{50}$ (left) and Si—OTPP$_{50}$ (left)
Figure 3B:
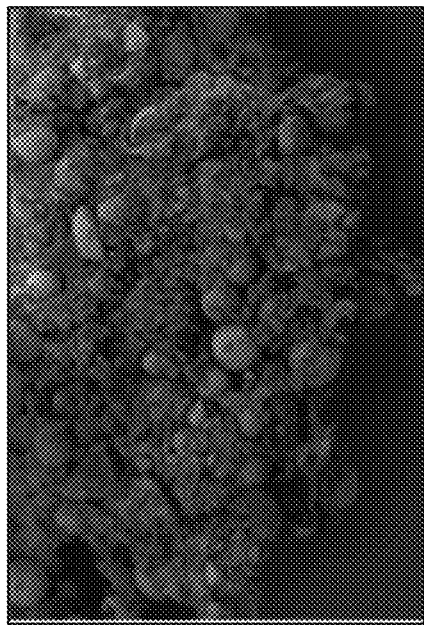

Scanning electron microscopy (SEM) comparison between Si—OBAC$_{50}$ (Compound 4) and the longer chained Si—OBAC$_{100}$ (Compound 5) is visually noticed by the SEM images (FIG. 2).

Si—OBAC$_{50}$ (Compound 4) was evaluated for the scavenging of nucleophilic species. In this regard, a variety of alcohols were benzoylated to yield the corresponding esters (Compounds 6a-h) via Scheme 2, whereby excess alcohol (0.5 equivalents) was scavenged efficiently with Si—OBAC$_{50}$ (Compound 4) (see Table 1).

TABLE 1

Benzoylation reactions utilizing Si—OBAC$_{50}$ (Compound 4) to scavenge excess alcohol Scheme 2

R$^1$—C(O)—Cl (1 eq.) + R$^2$—OH (1.5 eq.) → [i. Et$_3$N, DCM RT, 2 h; ii. Si—OBAC 4, 45 ¼ C, 2-4 h; iii. Celite SPE] → R$^1$—C(O)—O—R$^2$  6 a-h

| Entry | R$^1$ | R$^2$ | Conversion (%)[b] | Crude Purity (%)[b] |
|---|---|---|---|---|
| 1 | 3-MeBn | BnOH | >95% | >95% |
| 2 | 3-MeBn | Geraniol | >95% | >95% |
| 3 | 3-MeBn | FurfurylOH | >95% | >95% |
| 4 | 1-Adamantane | PMBOH | >95% | >95% |
| 5 | 4-OMeBn | PMBOH | >95% | >95% |
| 6 | Cinnamoyl | PMBOH | >95% | >95% |
| 7 | 3-OMeBn | PMBOH | >95% | >95% |

[a]Reagents and conditions: Acid Chloride (1 eq.), Alcohol (1.5 eq.), Et$_3$N (1 eq.), dry DCM (0.1M), Si—OBAC$_{50}$ 4 (1 eq.), 45° C.
[b]Conversion and crude purity calculated by $^1$H NMR.

Benzyl 3-methylbenzoate (Compound 6a)

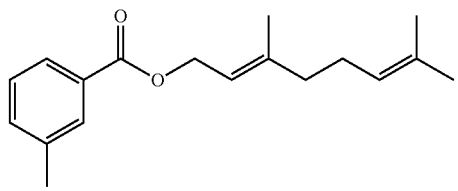 [SMILES: CC(C)=CCC/C(C)=C/COC(=O)c1cccc(C)c1]

(E)-3,7-Dimethylocta-2,6-dien-1-yl 3-methylbenzoate (Compound 6b)

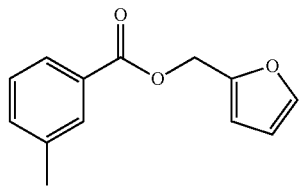 [SMILES: Cc1cccc(C(=O)OCc2ccco2)c1]

Furan-2-ylmethyl 3-methylbenzoate (Compound 6c)

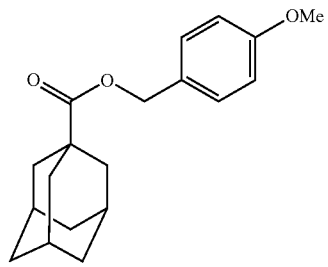 [SMILES: COc1ccc(COC(=O)C23CC4CC(CC(C4)C2)C3)cc1]

4-Methoxybenzyl adamantane-1-carboxylate (Compound 6d)

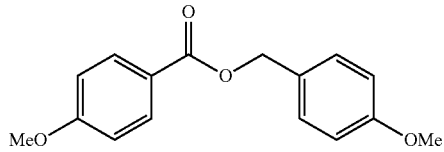 [SMILES: COc1ccc(COC(=O)c2ccc(OC)cc2)cc1]

4-Methoxybenzyl 4-methoxybenzoate (Compound 6e)

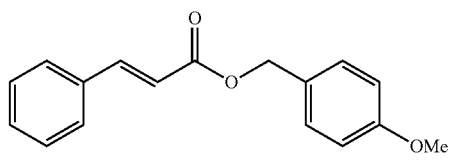 [SMILES: COc1ccc(COC(=O)/C=C/c2ccccc2)cc1]

4-Methoxybenzyl cinnamate (Compound 6f)

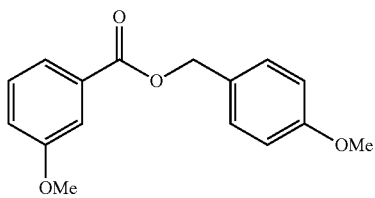 [SMILES: COc1ccc(COC(=O)c2cccc(OC)c2)cc1]

4-Methoxybenzyl 3-methoxybenzoate (Compound 6g)

Coupling benzoyl chlorides and alcohols for the synthesis of benzylesters (Compounds 6a-h) can be performed utilizing Si—OBAC scavenging. Briefly, to a 1 dram vial, was added alcohol (1 equiv., 0.269 mmol), Et$_3$N (1 equiv., 0.269 mmol), and dry CH$_2$Cl$_2$ (0.1 M). The reaction mixture was stirred for 10 minutes, followed by the addition of acid (1 equiv., 0.269 mmol). The reaction was stirred for 2 hours at room temperature, after which time, Si—OBAC$_{50}$ (Compound 4) (1 eq. 0.269 mmol) was added and the reaction was stirred for an additional 2-4 hours (TLC monitoring). Upon completion, the reaction was filtered through a celite SPE and concentrated under vacuum to yield the desired ester.

Utilizing 1 equivalent of Si—OBAC$_{50}$ (Compound 4), the desired esters (Compounds 6 a-h) were isolated in high crude purity and conversion via Celite® SPE, demonstrating the efficient ability of Si—OBAC$_{50}$ (Compound 4) to work as a facile scavenger. Identical results were observed when utilizing the high-load, hybrid Si—OBAC$_{100}$ (Compound 5).

Synthesis of other PPHM can be conducted as described in Scheme 3. Scheme 3 provides the synthesis of silica-grafted oligomeric dichlorotriazine (compound 9; Si—ODCT$_{50}$) and triphenylphosphine (Compound 10; Si—OTTP$_{50}$) utilizing surface-initiated ROMP from Nb-tagged silica particles. In this regard, synthesis of the corresponding PPHM Si—ODCT$_{50}$ (Compound 9) and Si—OTPP$_{50}$ (Compound 10) was conducted via the grafting of the corresponding Nb-tagged dichlorotriazine (Compound 7), and Nb-tagged triphenylphosphine (Compound 8).

Scheme 3

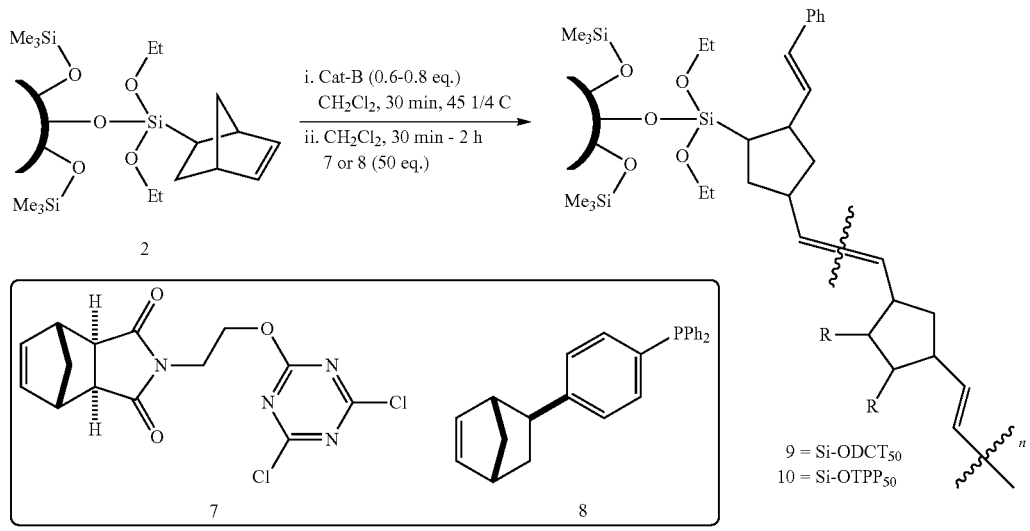

Utilizing the same protocol reported for the synthesis of Si—OBAC$_{50}$ (Compound 4) (Scheme 1), Si—ODCT$_{50}$ (Compound 9; theoretical load=2.74 mmol/g) and Si—OTPP$_{50}$ (Compound 10; theoretical load=1.36 mmol/g) were successfully isolated as a free-flowing powder. The theoretical load of both reagents was further increased by extending the oligomeric length to 100 monomer units, yielding the corresponding materials Si—ODCT$_{100}$ (Compound 11; 3.7 mmol/g) and Si—OTPP$_{100}$ (Compound 12; 1.83 mmol/g) respectively.

Si—ODCT$_{50}$ was evaluated as a coupling reagent for the synthesis of amides (Compounds 13a-h) from simple acids and amines under mild conditions (see Table 2 and Scheme 4). As demonstrated by Table 2, a variety of amines and acids were efficiently coupled together utilizing Si—ODCT$_{50}$ (Compound 9) in high conversion and crude purity without the need for standard chromatography. Si—ODCT$_{50}$ (Compound 9) demonstrated the same efficiency in comparison to the soluble oligomeric version ODCT for the formation of amides.

TABLE 2

Amide coupling reactions utilizing Si—ODCT$_{50}$ (Compound 9)

Scheme 4

| Entry | R$^1$ | R$^2$NHR$^3$ | Conversion (%) | Crude Purity (%) |
|---|---|---|---|---|
| 1 | 3,4-DiMeBn | n-Butylamine | >95% | >95% |
| 2 | 4-MeBn | Pyrrolidine | >95% | >95% |
| 3 | 4-MeBn | Isopropylamine | >95% | >95% |
| 4 | Bn | Benzylamine | >95% | >95% |
| 5 | 4-OMe-3-MeBn | Pyrrolidine | >95% | >95% |
| 6 | 4-ClBn | n-Butylamine | >95% | >95% |
| 7 | Trans-Cinnamic | n-Butylamine | >95% | >95% |

[a] Reagents and conditions: Acid (1 equiv.), Amine (1 equiv.), NMM (3 equiv.), dry DCM (0.075M), Si—ODCT$_{50}$ 9 (2-3 equiv.).
[b] Conversion and Crude purity calculated by $^1$H NMR.

Coupling of acids and amines with Si—ODCT can be performed to synthesize amides (Compounds 13a-h). Into a 1 dram vial was added Si—ODCT (Compound 9 or 10) (2 equiv., 0.274 mmol), dry CH$_2$Cl$_2$ (0.075 M), acid (1 equiv., 0.136 mmol) and NMM (3 equiv., 0.408 mmol). The crude reaction mixture was stirred for 10 minutes at RT, after such time was added amine (1 equiv., 0.136 mmol) and the reaction was stirred for 2-6 hours. After such time, the crude reaction mixture was filtered through a celite/silica SPE and concentrated to yield the desired amide.

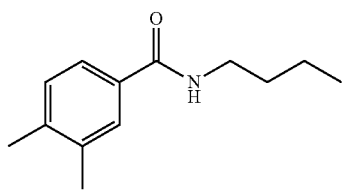

N-Butyl-3,4-dimethylbenzamide (Compound 13a).

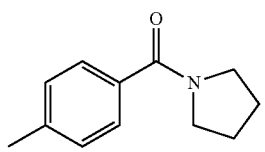

Pyrrolidin-1-yl(p-tolyl)methanone (Compound 13b).

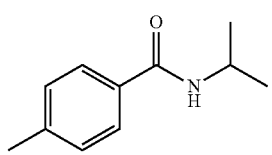

N-Isopropyl-4-methylbenzamide (Compound 13c).

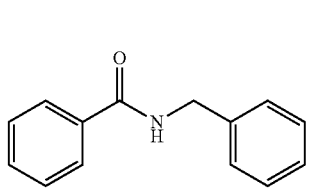 [SMILES: O=C(NCc1ccccc1)c1ccccc1]

N-Benzylbenzamide (Compound 13d).

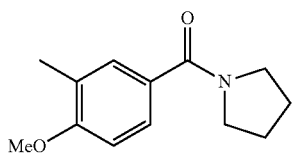 [SMILES: COc1ccc(C(=O)N2CCCC2)cc1C]

(4-Methoxy-3-methylphenyl)(pyrrolidin-1-yl)methanone (Compound 13e).

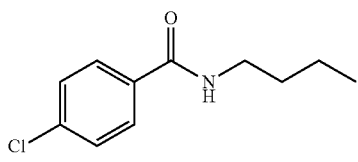

N-Butyl-4-chlorobenzamide (Compound 13f).

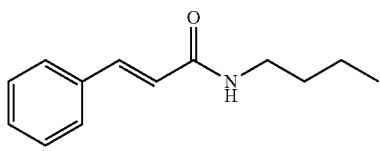

N-Butylcinnamamide (Compound 13g).

Section 2

It has been found that the oligomeric benzyl phosphates ($OBP_n$) can be used as soluble, stable benzylating reagents. For clarity, the compounds in Section 2 below, are identified with the compound number followed by "x" to distinguish these compounds from the compounds in Section 1 above. As such, the compounds in the schemes and tables of Section 2 are identified in the corresponding text by adding an "x" suffix. Several thermal isomerization reactions of the inexpensive endo carbic anhydride Compound 1x were performed on large scale using classical methods. Sequential recrystallizations in toluene yielded exo product Compound 2x with diastereomeric ratios progressively increasing and yields decreasing with each recrystallization, i.e., dr=15:1 and 39% yield after three recrystallizatons, dr=29:1 and 34% yield after four, up to dr=84:1 and 20% yield after six. Reduction of Compound 2x with $LiAlH_4$ yielded diol Compound 3x as a clear, viscous oil with good yield. Phosphorylation of the exo diol Compound 3x was performed using distilled $POCl_3$ and $Et_3N$ in the presence of catalytic DMAP to yield phosphorochloridate Compound 4x as a white solid in moderate yields.

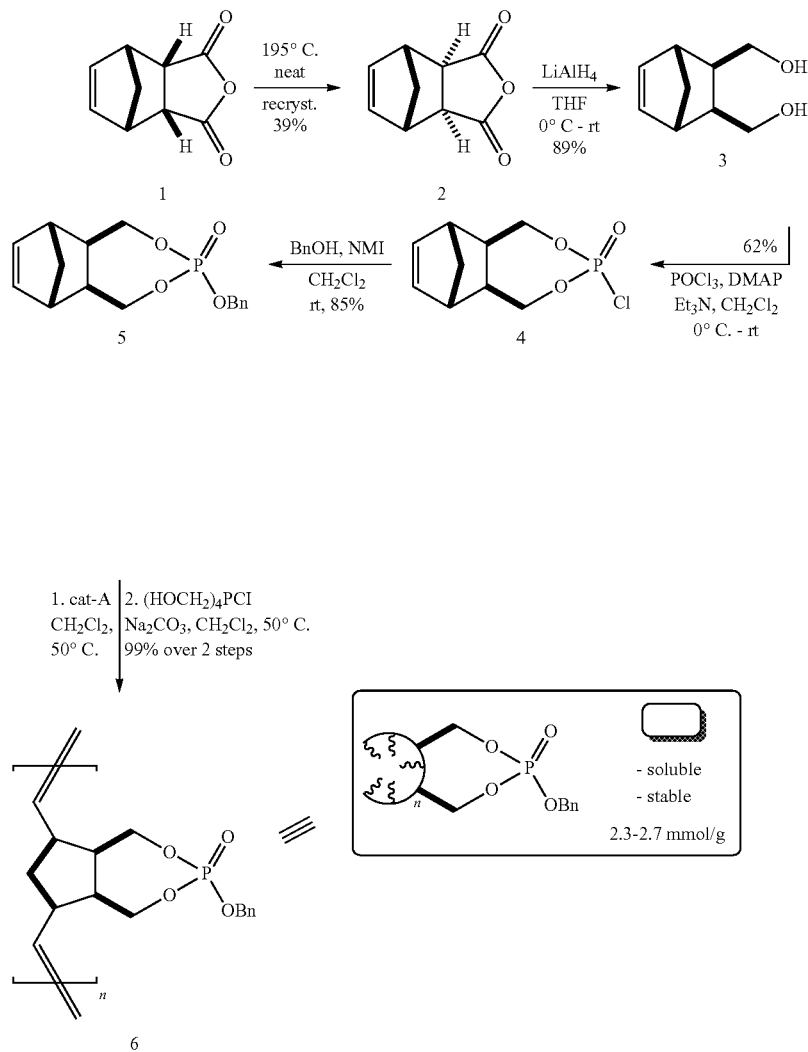

Addition of Compound 4x into a solution containing benzyl alcohol, NMI, and CH$_2$Cl$_2$ at room temperature cleanly afforded the benzyl phosphate Compound 5x in good yields and purity. Polymerization of Compound 5x and other phosphate analogs of this type in the presence of (IMesH$_2$)(PCy$_3$)(Cl)$_2$Ru=CHPh (cat. B) occurred rapidly at room temperature resulting in formation of insoluble and unusable gels. However, polymerization with RuCl$_2$(PCy$_3$)$_2$=CHPh (cat. A), cleanly afforded the oligomeric reagent with desirable characteristics. Following polymerization, the reaction was quenched with ethyl vinyl ether (EVE) and stirred for 30 minutes. A basic workup involving the Pederson protocol was applied in the same pot until cat-A was visibly removed as indicated by precipitate formation and lack of coloration. The resulting solution was washed several times with water, dried over MgSO$_4$ and concentrated to critical viscosity. Precipitation via dropwise addition into anhydrous Et$_2$O afforded oligomeric benzyl phosphate (OBP$_n$; Compound 6x) as a free-flowing white solid where n=relative lengths of 20, 50, and 100-mers—each displaying slightly different solubility profiles.

The oligomeric benzyl phosphate 20-mer (OBP$_{20}$) was then investigated for benzylation of various amines (Table 3). The reagent was delivered either as a free-flowing powder or as a stock solution in anhydrous CHCl$_3$ alongside a catalytic amount of tetrabutylammonium iodide. During the reaction, precipitation of the resulting oligomeric phosphate monoanion typically occurred within a 0.5-2 hour period after addition of the nucleophile. The mother liquor was subsequently concentrated over silica or precipitated into Et$_2$O, filtered via silica SPE and concentrated under vacuum to afford the corresponding the benzylated analog(s) in good to excellent yields and high purity. The resulting monoanionic oligomeric phosphate was found to be water soluble at elevated temperatures and remained soluble upon cooling to room temperature. This observation would be of particular importance in potential large-scale applications for the removal of spent oligomer.

A number of cyclic and acyclic amines, as well as O and S nucleophiles, were subjected to the established benzylation protocol and were found to proceed smoothly to afford the desired benzylated products in excellent yields and purities (Table 3). A number of monomeric analogs of OBP were also prepared in good yields using several substituted benzyl alcohols. Subjection of the monomers to the established ROMP polymerization protocol afforded the desired oligomeric products in excellent yields as free-flowing white solids. Interestingly, efforts towards production of monomeric phosphates (Compounds 5ax-5dx) did not afford the desired products. This is likely due to a combination of the substituent mesomeric effect and/or eliminative degradation pathways of these phosphates (Table 4). The corresponding oligomers (Compounds 6ex-6lx) were subjected to established benzylation conditions utilizing morpholine as a test substrate and conveniently afforded the desired benzylated products in moderate to good yields and purities (Table 5). See Scheme 5.

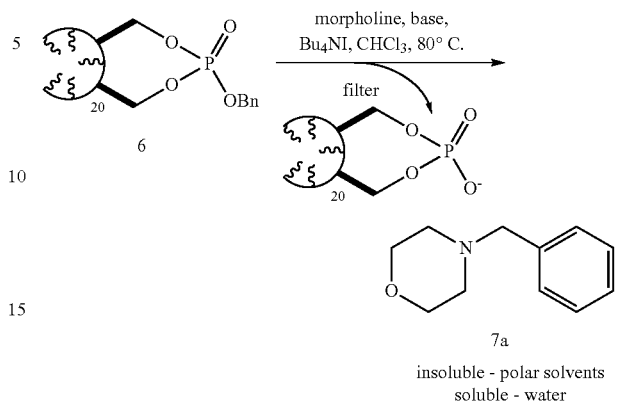

Scheme 5. Benzylation of morpholine.

7a
insoluble - polar solvents
soluble - water

The 20-mer of OBP was tested on a select benzofused sultam scaffold for benzylation (Table 6). The reagent was added to a THF solution containing benzothiaoxazepine-1,1-dioxide (Compound 9ax) in the presence of K$_2$CO$_3$ and Bu$_4$NI and stirred at 80° C. overnight. The resulting mother liquor was precipitated from a Et$_2$O/EtOAc mixture. Subsequent filtration employing a silica SPE cartridge, and evaporation of solvent, afforded the desired benzylated product (Compound 10ax) in excellent yield and high purity. With this result in place, sultams (Compounds 9ax-9dx) were subjected to benzylation employing OBP derivatives utilizing the conditions established above to afford the desired products (Compounds 10bx-10hx) in good to excellent yields.

TABLE 3

(The compounds are Compounds 7ax-7mx, as shown below with an "x" being added to the compound number for clarity).

| nucleophile | pdt | yield (%)[a] | purity (%)[b] |
| --- | --- | --- | --- |
| morpholine | 7a | 99 | 98 |
| thiomorpholine | 7b | 93 | 98 |
| N-phenylpiperizine | 7c | 98 | 99 |
| piperizine | 7d | 95 | 97 |
| pyrrolidine | 7e | 80 | 99 |
| piperidine | 7f | 73 | 99 |
| dihydroindole | 7g | 98 | 85 |
|  | 7h | 69 | 97 |
| phenol | 7i | 80 | 95 |
| lithium thiophenolate[e] | 7j | 98 | 96 |
| Bn—NH$_2$ | 7k/7l | 99[c] | 4:1[d] |
| Ph—NHEt | 7m | 81 | 89 |

TABLE 4

Synthesis of various OBP analogs (Compounds 5ax-5lx and 6e-6lx as shown below with an "x" being added to the compound number for clarity for clarity).

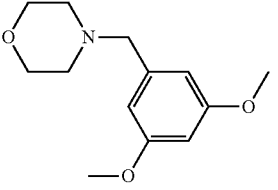 [SMILES: COc1cc(CN2CCOCC2)cc(OC)c1]

| monomer | Ar | yield (%)[a] |
|---|---|---|
| 5a | (benzo[1,3]dioxol-5-yl) | 23% |
| 5b | (4-methoxyphenyl) | 21% |
| 5c | (furan-2-yl) | <10% |
| 5d | (1H-indol-3-yl) | <10% |
| 5e | o-CH₃Ph | 75% |
| 5f | 3,5-(OCH₃)₂Ph | 70% |
| 5g | p-BrPh | 79% |
| 5h | p-ClPh | 76% |
| 5i | p-FPh | 80% |
| 5j | p-NO₂Ph | 70% |
| 5k | m-N(CH₃)₂Ph | 73% |
| 5l | p-CF₃Ph | 77% |

TABLE 5

Benzylation of Amines using various OBP analogs (Compounds 6ex-6lx and Compounds 8ex-8lx as shown below with an "x" being added to the compound number for clarity).

| entry | SM | product | | yield (%) | purity (%)[a] |
|---|---|---|---|---|---|
| 1 | 6e | (morpholine-N-CH₂-(2-methylphenyl)) | 8e | 64 | 94 |
| 2 | 6f | (morpholine-N-CH₂-(3,5-dimethoxyphenyl)) | 8f | 54 | 89 |
| 3 | 6g | (morpholine-N-CH₂-(4-bromophenyl)) | 8g | 82 | 93 |
| 4 | 6h | (morpholine-N-CH₂-(4-chlorophenyl)) | 8h | 67 | 97 |
| 5 | 6i | (morpholine-N-CH₂-(4-fluorophenyl)) | 8i | 70 | 96 |
| 6 | 6j | (morpholine-N-CH₂-(4-nitrophenyl)) | 8j | 74 | 93 |
| 7 | 6k | (morpholine-N-CH₂-(3-dimethylaminophenyl)) | 8k[b] | 78 | 98 |
| 8 | 6k | (Ph-piperazine-N-CH₂-(3-dimethylaminophenyl)) | 8k'[b] | 93 | 98 |
| 9 | 6l | (morpholine-N-CH₂-(4-trifluoromethylphenyl)) | 8l | 68 | 95 |

TABLE 6

Benzylation of Benzothiaoxazepine-1,1-dioxides (Compounds 9ax-9dx and Compounds 10ax-10hx as shown below with an "x" being added to the compound number for clarity).

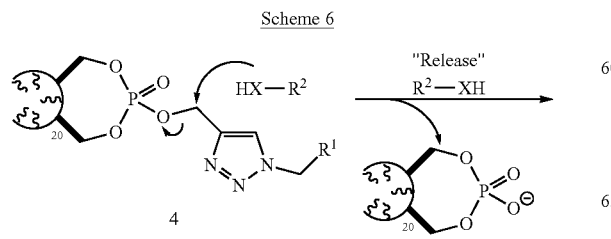

| SM | R[1] | R[2] | R[3] | R[4] | pdt | yield (%)[a] |
|---|---|---|---|---|---|---|
| 9a | 4-Br | Ph | H | Bn | 10a | 99 |
| 9a | 4-Br | Ph | H | 3,5-diMeO—Bn | 10b | 72 |
| 9a | 4-Br | Ph | H | 4-F Bn | 10c | 85 |
| 9b | 4-Br | $^i$Bu | H | 4-F Bn | 10d | 97 |
| 9b | 4-Br | $^i$Bu | H | 2-Me Bn | 10e | 81 |
| 9c | 3-Cl | $^i$Bu | H | 4-Cl Bn | 10f | 76 |
| 9d | 5-Cl | Me | Ph | 2-Me Bn | 10g | 78 |
| 9d | 3-Cl | Me | Ph | 2-Me Bn | 10h | 83 |

Section 3

Synthesis of ROMP-derived triazolating reagents (OTP) can be performed. These reagents can be used in purification free diversifications of nucleophilic species using "Click"-Capture, ROMP, Release. For clarity, the compounds in Section 3 below are identified with the compound number followed by "y" to distinguish these compounds from the compounds in Section 1 and Section 2 above. As such, the compounds in the schemes and tables of Section 3 are identified in the corresponding text by adding a "y" suffix. This method utilizes a propargyl-tagged norbornenyl-phosphate to capture an azide in a classical "click" reaction, followed by ROMP polymerization to generate the desired soluble oligomeric triazole reagent (OTP) (Compound 4y). Subsequent release via $S_N2$ displacement with nucleophilic species yields triazolated products along with the spent oligomeric phosphate that is readily sequestered via precipitation (Scheme 6).

Scheme 6

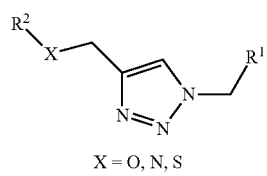

X = O, N, S

Scheme 6

The synthesis of the oligomeric triazole phosphate bearing a 4-MeOPh group OTP (Compound 4ay) starts with the exo-norbornenyl tagged (Nb-tagged) phosphonyl chloride (Compound 1y) utilized in the synthesis of previously reported ROMP-derived benzylating reagent OBP. Phosphorylation of propargyl alcohol with Nb-tagged phosphonyl chloride (Compound 1y), followed by a "Click"-capture event of the corresponding azide, yields the desired monomer (Compound 3ay) in an efficient fashion. ROMP polymerization of monomer (Compound 3ay) was achieved with $RuCl_2(PCy_3)_2$=CHPh (cat-A), followed by basic workup utilizing the Pederson protocol. Precipitation via dropwise addition into anhydrous $Et_2O$ afforded the corresponding oligomeric triazole phosphate ($OTP_{20}$; Compound 4ay) as a free-flowing white solid possessing a theoretical load of 2.4 mmol/g (Scheme 7, where "y" is added to the compound number in the text for clarity).

Scheme 7

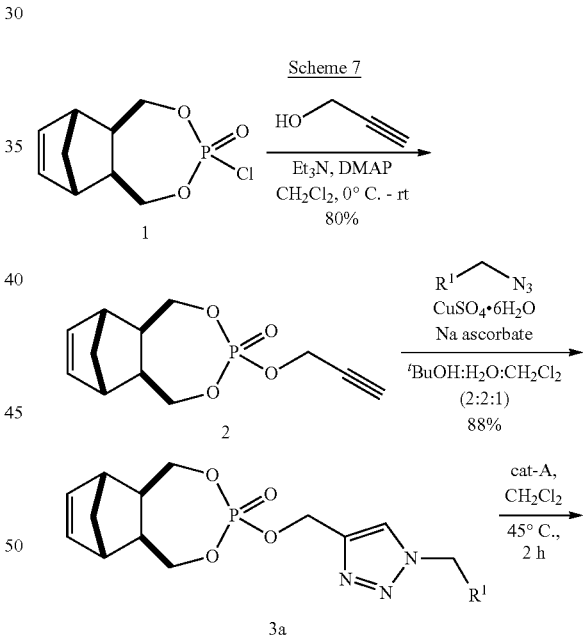

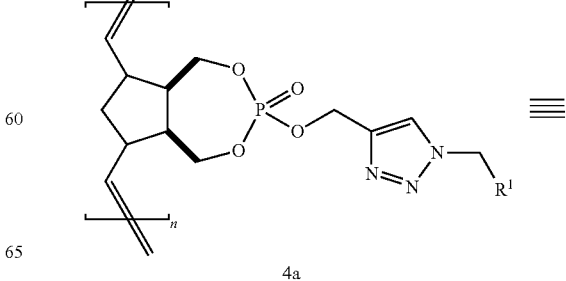

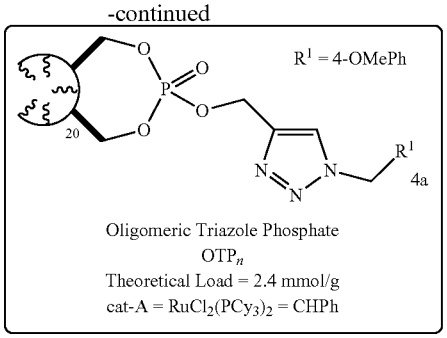

Oligomeric Triazole Phosphate
OTP$_n$
Theoretical Load = 2.4 mmol/g
cat-A = RuCl$_2$(PCy$_3$)$_2$=CHPh Investigation into the utilization of OTP (Compound 4ay) as a direct triazolating reagent was next studied using reaction conditions reported for the application of OBP. After optimization of reaction conditions for the triazolation of 2,4-dichlorophenol utilizing OTP (Compound 4ay), the corresponding triazole ether (Compound 5ay), was isolated in excellent yield (99%) and crude purity (>90%) using simple filtration through a Celite® SPE (Scheme 8).

Scheme 8

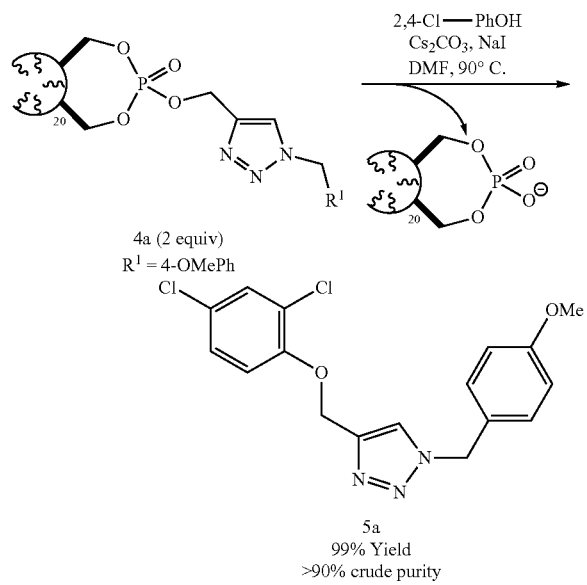

5a
99% Yield
>90% crude purity

The application of OTP (Compound 4ay) as an efficient triazolating reagent was extended to a variety of N-, O- and S-nucleophilic species (Table 7). Initially, a variety of phenols were utilized (Table 7, entries 1-3) though reduced yields were observed for sterically hindered napthalene-1-ol. In addition to phenols, thiophenols (Table 7, entry 5) and a variety of amines (Table 7, entries 6-10) were successfully utilized to release the corresponding triazole in >90% crude purity. Building on the success of OTP (Compound 4ay), a variety of additional OTP derivatives (Compounds 4by-4iy) were synthesized as free-flowing powders on gram scale from ROMP polymerization of their corresponding monomers utilizing cat-A (Table 8).

With a variety of OTP (Compound 4y) derivatives in hand, the triazolation of both naphthalene-1-ol and N-ethylnaphthalen-1-amine with OTP derivatives (Compounds 4ay-4gy) was investigated (Table 9). All reactions proceeded with good yields with >90% crude purity after Celite® SPE to remove the spent oligomer.

TABLE 7

(Reaction of Compounds 4ay to form Compounds 5ay-5jy, where a "y" is added to the compounds listed in the table for clarity).

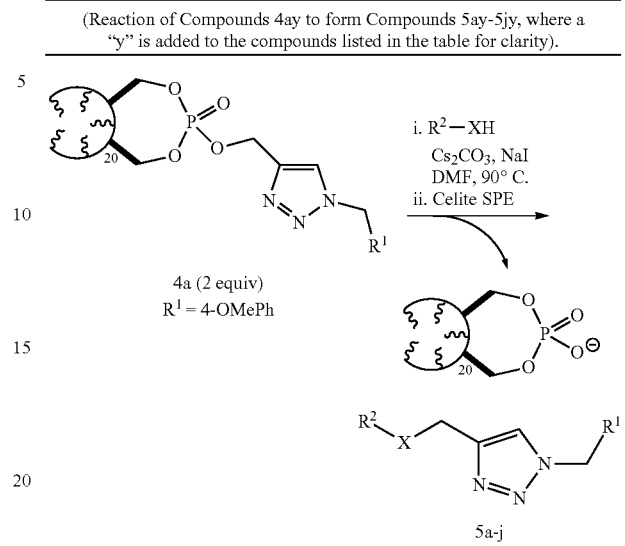

| entry | nucleophile | pdt | yield (%)[b] |
|---|---|---|---|
| 1 | 2,4-Cl—PhOH | 5a | 98 |
| 2 | 4-F—PhOH | 5b | 92 |
| 3 | 4-$^t$Bu—PhOH | 5c | 90 |
| 4 | naphthalene-1-ol | 5d | 69 |
| 5 | 4-SMe—PhSH | 5e | 60 |
| 6 | morpholine | 5f | 72 |
| 7 | thiomorpholine | 5g | 75 |
| 8 | 1-phenylpiperazine | 5h | 95 |
| 9 | indoline | 5i | 88 |
| 10 | N-ethylnaphthalen-1-amine | 5j | 62 |

TABLE 8

(Reaction of Compounds 3ay-3iy to form Compounds 4ay-4iy, where a "y" is added to the compounds listed in the table for clarity).

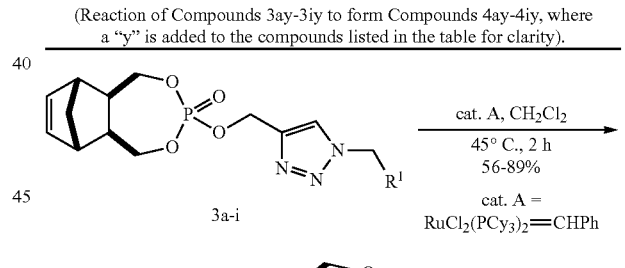

| monomer | R$^1$ | pdt | yield (%)[a] |
|---|---|---|---|
| 3a | 4-OMe—Ph | 4a | 82 |
| 3b | 4-Me—Ph | 4b | 88 |
| 3c | 2-Me—Ph | 4c | 77 |
| 3d | 4-Cl—Ph | 4d | 71 |
| 3e | 4-F—Ph | 4e | 74 |
| 3f | 4-CF$_3$—Ph | 4f | 73 |
| 3g | Cylohexyl | 4g | 70 |
| 3h | 4Br—Ph | 4h | 89 |
| 3i | Furfuryl | 4i | 56 |

TABLE 9

(Reaction of Compounds 4ay-4hy to form Compounds 6ay-6ny, where a "y" is added to the compounds listed in the table for clarity).

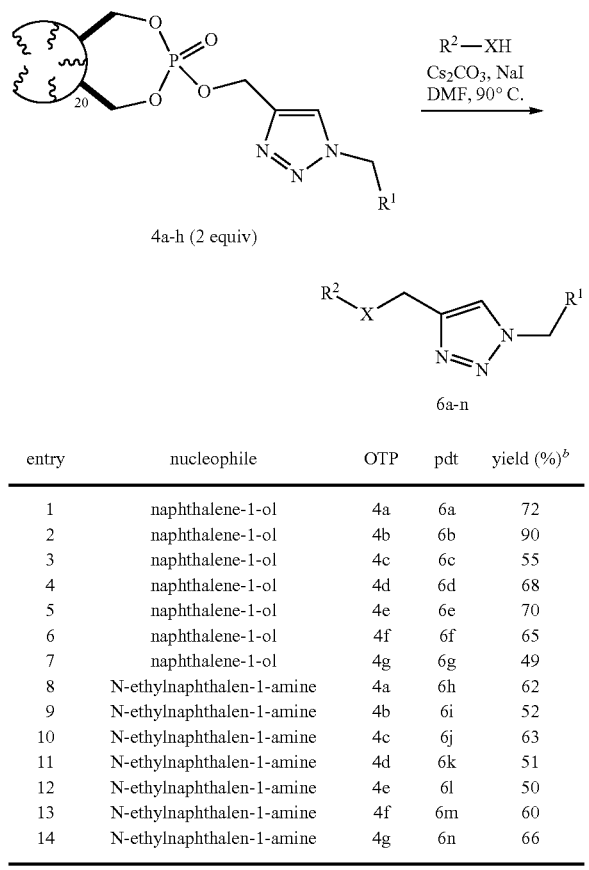

| entry | nucleophile | OTP | pdt | yield (%)[b] |
|---|---|---|---|---|
| 1 | naphthalene-1-ol | 4a | 6a | 72 |
| 2 | naphthalene-1-ol | 4b | 6b | 90 |
| 3 | naphthalene-1-ol | 4c | 6c | 55 |
| 4 | naphthalene-1-ol | 4d | 6d | 68 |
| 5 | naphthalene-1-ol | 4e | 6e | 70 |
| 6 | naphthalene-1-ol | 4f | 6f | 65 |
| 7 | naphthalene-1-ol | 4g | 6g | 49 |
| 8 | N-ethylnaphthalen-1-amine | 4a | 6h | 62 |
| 9 | N-ethylnaphthalen-1-amine | 4b | 6i | 52 |
| 10 | N-ethylnaphthalen-1-amine | 4c | 6j | 63 |
| 11 | N-ethylnaphthalen-1-amine | 4d | 6k | 51 |
| 12 | N-ethylnaphthalen-1-amine | 4e | 6l | 50 |
| 13 | N-ethylnaphthalen-1-amine | 4f | 6m | 60 |
| 14 | N-ethylnaphthalen-1-amine | 4g | 6n | 66 |

Monomer-on-monomer (MoM) Mitsunobu reactions can use norbornenyl-tagged (Nb-tagged) reagents that are rapidly sequestered post reaction using ROMP, which is initiated by any of three methods utilizing Grubbs catalyst cat-B: (i) free catalyst in solution, (ii) surface-initiated catalyst-armed silica, or (iii) surface-initiated catalyst-armed Co/C magnetic nanoparticles (Nps). With the norbornenyl-tagged $PPh_3$ (Nb-TPP) and DEAD (Nb-BEAD), their application in the Mitsunobu reaction utilizing a variety of benzoic acids and benzyl alcohols was studied (Table 10, entry 1-6). Utilizing 1.3 equivalents of both reagents, the desired esters were synthesized in good yield and purity without the need for standard chromatography.

Efficient purification was achieved by the phase switching of the Nb-tagged monomeric reagents/spent reagents by the application of ROM polymerization. This process transforms the Nb-monomeric reagents into a soluble oligomeric polymer, possessing a differential solubility profile to the desired products. Precipitation of the spent oligomer in $Et_2O$ or MeOH, followed by filtration via a silica SPE yields the desired products in high crude purity. This purification protocol can be observed via TLC analysis, whereby a multi-spot crude reaction is purified to a single product spot utilizing the polymerization sequestration protocol. Building on these results, the MoM protocol was implemented efficiently for the esterification and stereoinversion of chiral, non-racemic secondary alcohols (Table 10, entries 9-12).

Investigations were directed toward sequestration of the functionalized Nb-monomers by polymerizing off a catalyst-armed immobilized surface. Sequestration in this manner would further optimize the MoM protocol by removing the need for precipitation and ultimately result in an overall more cost efficient and environmental friendly protocol. To this effect, the use of silica or carbon-coated cobalt (Co/C) nanoparticles bearing a norbornene moiety, was envisioned for the sequestration of excess/spent Nb-tagged reagents via surface-initiated ROM polymerization. Magnetic nanoparticles are increasingly being used as supports for immobilized catalysts in chromatography-free protocols, whereas Nb-tagged silica particles have been utilized to synthesize silica surface grafted polymer supports. Arming of the nanoparticle surface (1 equiv.) with cat-B (0.6-0.8 equiv.) for 30 minutes before the addition of the crude reaction mixture provided good results.

With the corresponding Nb-tagged silica and Nb-tagged Co/C in hand, the employment of the MoM Mitsunobu reaction utilizing catalyst-armed Si-particles (Table 11, entries 1-5) and Co/C Nps (Table 11, entries 6-11) was successfully achieved yielding the desired products in high crude purity. Purification when using Si-armed particles was minimized to a simple filtration of the crude reaction via a Celite® SPE. The application of Co/C magnetic Nps required simple application of an external magnet to the reaction vessel and decantation of the crude mixture.

TABLE 10

Mitsunobu Esterification Utilizing Nb—TPP and Nb—DEAD.

| entry | $R^1$ | $R^2$—OH | yield (%) | purity (%) |
|---|---|---|---|---|
| 1 | 4-$NO_2$ | 2-MeBnOH | 75 | >95 |
| 2 | 4-$NO_2$ | 3,5-OMeBnOH | 77 | >95 |
| 3 | 4-$NO_2$ | 3-Me-2-butene-1-ol | 78 | >95 |
| 4 | 2,4-Cl | 2-MeBnOH | 79 | >95 |
| 5 | 4-$NO_2$ | 4-ClBnOH | 84 | >95 |
| 6 | 4-$NO_2$ | 4-BrBnOH | 81 | >95 |
| 7 | 2-Me | 3-$NMe_2$BnOH | 81 | >95 |
| 8 | 3,4-Cl | 3-OMeBnOH | 91 | >95 |
| 9 | 4-$NO_2$ | (R)-MeCH(OH) $CO_2$Et | 74 | >95 |
| 10 | 2,6-Cl | (R)-MeCH(OH)$CO_2$Et | 71 | >95 |
| 11 | 3-$NMe_2$ | (R)-MeCH(OH) $CO_2$Et | 73 | >95 |
| 12 | 4-Cl | (R)-MeCH(OH) $CO_2$Et | 76 | >95 |

TABLE 11

MoM Mitsunobu Reaction utilizing Silica and Co/C nanoparticle sequestration.

i. Nb—BEAD
Nb—TPP
THF, 0° C. - rt
ii. Cat-B, DCM
Si—Nb or
Co/Si—Nb
45° C., 2 h
iii. Et$_2$O, filter

| entry | R$^1$ | R$^2$ | yield (%) | crude purity (%)$^a$ |
|---|---|---|---|---|
| 1$^b$ | 4-NO$_2$ | 2-MeBn | 84 | >95 |
| 2$^b$ | 4-NO$_2$ | 3,5-OMeBn | 88 | >95 |
| 3$^b$ | 4-NO$_2$ | 4-BrBn | 82 | >95 |
| 4$^b$ | 4-NO$_2$ | 3-NMe$_2$Bn | 83 | >95 |
| 5$^b$ | 2-Me | 3,5-NMe$_2$Bn | 87 | >95 |
| 6$^c$ | 4-NO$_2$ | 4-ClBn | 84 | >95 |
| 7$^c$ | 4-NO$_2$ | 3,5-OMeBn | 88 | >95 |
| 8$^c$ | 4-NO$_2$ | 4-BrBn | 82 | >95 |
| 9$^c$ | 4-Cl | 3-NMe$_2$Bn | 83 | >95 |
| 10$^c$ | 2-Me | 3-NMe$_2$Bn | 87 | >95 |
| 11$^c$ | 3,4-Cl | 3,5-OMeBn | 93 | >95 |

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular or conversely, from the singular to the plural, as is appropriate to the context and/or application. The various singular/plural permutations may be expressly set forth herein for sake of clarity.

It will be understood by those within the art that, in general, the terms used herein, and especially in the appended claims (e.g., bodies of the appended claims), are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member, or subgroup of members, of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling, the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells.

Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

The invention claimed is:

1. A particle-polymer hybrid material comprising:
a substance having the structure of Formula 1:

Z(Y-FP)$_m$    (Formula 1);

Z is a silica particle smaller than 1 mm;
m is an integer;
Y is a linker including a Si atom linked to 1 to 3 oxygen atoms of the silica particle;
FP is a functionalized polymer comprising:
a first structure derived from a first norbornene compound linked to Y; and
one or more repeating units linked to the first structure, each unit being derived from a second norbornene compound and having a functional group, the functional group being selected from the group consisting of bis-acid chloride (BAC); dichlorotriazine (DCT); triphenyl phosphine (TPP); triazole phosphate (TP); alkyl-triphenyl phosphine (Nb-alkyl-TPP); di-triphenylphosphine (Nb-Di-TPP); carbodiimide (ACC); benzyl phosphate (BP); monoamine (MAm); monoethyl azodicarboxylate (MEAD); benzylethyl azodicarboxylate (BEAD); sulfonyl chloride (SC); benzenesulfonyl chloride (BCS); acetic acid (HAc); pyridine (Py); benzaldehyde (BA); chlorophosphate (PC); and Trimercaptotriazine (TMT).

2. The particle-polymer hybrid material of claim 1, wherein Y further includes an alkyl group.

3. The particle-polymer hybrid material of claim 1, wherein Z is linked to the Si atom of Y through one oxygen atom of the silica.

4. A particle-polymer hybrid material comprising:
a substance having the structure of Formula 3a:

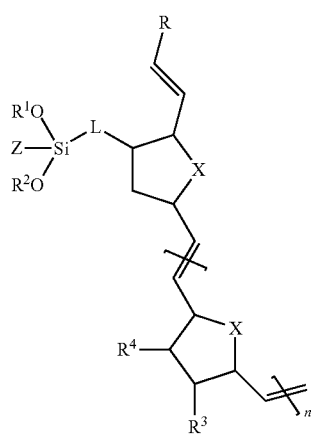

(Formula 3a)

Z is a silica particle smaller than 1 mm, wherein the Si of Formula 3a is liked to an oxygen atom of the silica;

R is selected from the group consisting of hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, and combinations thereof;
$R^1$ and $R^2$ are independently selected from the group consisting of hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, and combinations thereof;
L is a linker;
each X independently includes a carbon (C) or hetero atom selected from the group consisting of oxygen (O), nitrogen (N), sulfur (S), and phosphorus (P);
$R^3$ and $R^4$ are independently or in combination selected from the group consisting of halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, and combinations thereof so long as at least one of $R^3$ and $R^4$ includes a functional group capable of binding with another molecular entity; and
n is an integer.

5. The particle-polymer hybrid material of claim 4, wherein at least one of $R^3$ and $R^4$ includes a bis-acid chloride (BAC); dichlorotriazine (DCT); triphenyl phosphine (TPP); triazole phosphate (TP); phosphate triphenyl (Nb-PTP); di-triphenylphosphate (Nb-Di-TPP); carbodiimide (ACC); benzyl phosphate (BP); monoamine (MAm); monoethyl azodicarboxylate (MEAD); benzylethyl azodicarboxylate (BEAD); sulfonyl chloride (SC); benzenesulfonyl chloride (BCS); acetic acid (HAc); pyridine (Py); benzaldehyde (BA); chlorophosphate (PC); or Trimercaptotriazine (TMT).

6. The particle-polymer hybrid material of claim 4, wherein $R^3$ and $R^4$ cooperate to form the structure of Formula 4:

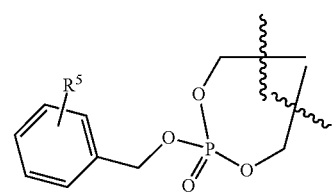

(Formula 4)

wherein $R^5$ includes hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof.

7. The particle-polymer hybrid material of claim 4, wherein $R^3$ and $R^4$ cooperate to form the structure of Formula 5:

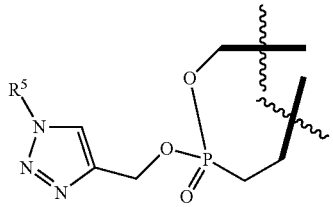

(Formula 5)

wherein $R^5$ includes hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof.

8. The particle-polymer hybrid material of claim 4, wherein $R^3$ and $R^4$ cooperate to form the structure of Formula 6:

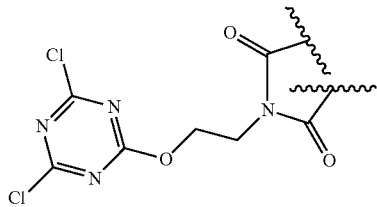

(Formula 6)

9. The particle-polymer hybrid material of claim 4, wherein $R^3$ and $R^4$ cooperate to form the structure of Formula 7:

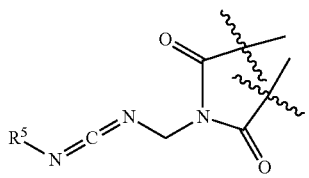

(Formula 7)

wherein $R^5$ includes hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof.

10. The particle-polymer hybrid material of claim 4, wherein $R^3$ and $R^4$ cooperate to form the structure of Formula 8:

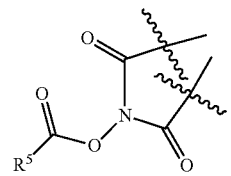

(Formula 8)

wherein $R^5$ includes hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof.

11. The particle-polymer hybrid material of claim 4, wherein $R^3$ and $R^4$ cooperate to form the structure of Formula 9:

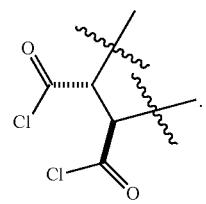

(Formula 9)

12. The particle-polymer hybrid material of claim 4, wherein:
one of $R^3$ or $R^4$ includes hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof; and
the other of $R^3$ or $R^4$ includes the structure of Formula 10:

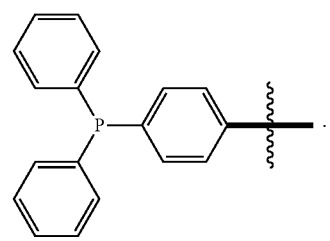

(Formula 10)

13. The particle-polymer hybrid material of claim 4, wherein:
one of $R^3$ or $R^4$ includes hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof; and the other of $R^3$ or $R^4$ includes the structure of Formula 11:

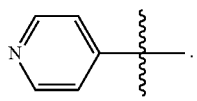

(Formula 11)

14. The particle-polymer hybrid material of claim 4, wherein:
one of $R^3$ or $R^4$ includes hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof; and
the other of $R^3$ or $R^4$ includes the structure of Formula 12:

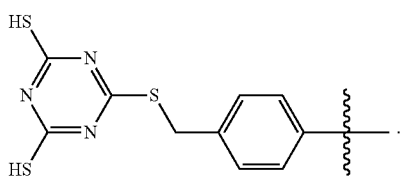

(Formula 12)

15. The particle-polymer hybrid material of claim 4, wherein:
one of $R^3$ or $R^4$ includes hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof; and
the other of $R^3$ or $R^4$ includes the structure of Formula 13:

(Formula 13)

16. The particle-polymer hybrid material of claim 4, wherein:
one of $R^3$ or $R^4$ includes hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof; and
the other of $R^3$ or $R^4$ includes the structure of Formula 14:

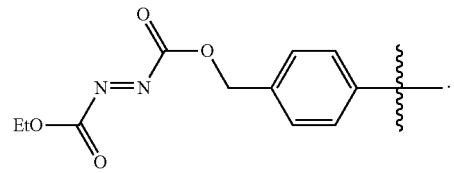

(Formula 14)

17. The particle-polymer hybrid material of claim 4, wherein:
one of $R^3$ or $R^4$ includes hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof; and
the other of $R^3$ or $R^4$ includes the structure of Formula 15:

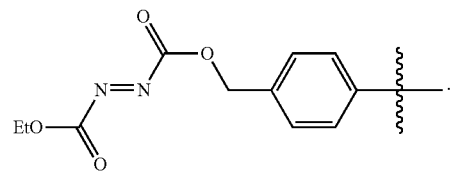

(Formula 15)

18. The particle-polymer hybrid material of claim 4, wherein:
one of $R^3$ or $R^4$ includes hydrogen, halogens, hydroxyls, alkoxys, straight aliphatics, branched aliphatics, cyclic aliphatics, heterocyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, or combinations thereof; and
the other of $R^3$ or $R^4$ includes the structure of Formula 16:

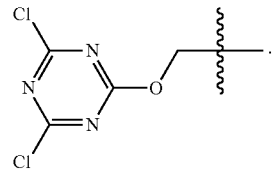

(Formula 16)

* * * * *